(12) United States Patent
Shikata

(10) Patent No.: US 7,290,158 B2
(45) Date of Patent: Oct. 30, 2007

(54) METHOD OF CONTROLLING DATA TRANSFER WITHIN A SEMICONDUCTOR INTEGRATED CIRCUIT BASED ON A CLOCK SYNC CONTROL SIGNAL

(75) Inventor: Takashi Shikata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 379 days.

(21) Appl. No.: 10/792,793

(22) Filed: Mar. 5, 2004

(65) Prior Publication Data

US 2005/0028018 A1 Feb. 3, 2005

(30) Foreign Application Priority Data

Jul. 31, 2003 (JP) ............... 2003-204617

(51) Int. Cl.
*G06F 1/12* (2006.01)
(52) U.S. Cl. ............... 713/400; 713/401; 713/500
(58) Field of Classification Search ........... 713/322, 713/400, 500, 401
See application file for complete search history.

(56) References Cited

U.S. PATENT DOCUMENTS

| | | | |
|---|---|---|---|
| 5,625,807 A | 4/1997 | Lee et al. | |
| 5,634,131 A | 5/1997 | Matter et al. | |
| 6,081,143 A * | 6/2000 | Ho et al. | 327/166 |
| 6,342,795 B1 | 1/2002 | Ohta | |
| 6,874,098 B2 * | 3/2005 | Tamemoto et al. | 713/500 |
| 2002/0024366 A1 * | 2/2002 | Ooishi et al. | 327/156 |
| 2002/0067915 A1 * | 6/2002 | Shida et al. | 386/111 |
| 2002/0159326 A1 * | 10/2002 | Shikata et al. | 365/233 |
| 2003/0037274 A1 | 2/2003 | Shikata et al. | |
| 2003/0062949 A1 * | 4/2003 | Suzuki | 327/564 |
| 2003/0090302 A1 * | 5/2003 | Hanamori | 327/113 |
| 2004/0044915 A1 * | 3/2004 | Bose et al. | 713/320 |
| 2004/0158760 A1 * | 8/2004 | Farmer et al. | 713/500 |
| 2004/0225781 A1 * | 11/2004 | Kotlowski et al. | 710/200 |

FOREIGN PATENT DOCUMENTS

| | | |
|---|---|---|
| JP | 6-202754 | 7/1994 |
| JP | 8-194663 | 7/1996 |
| JP | 10-161766 | 6/1998 |
| JP | 2000-035886 | 2/2000 |
| JP | 2000-99189 | 4/2000 |
| JP | 2000-347761 | 12/2000 |
| JP | 2003-058271 | 2/2003 |

OTHER PUBLICATIONS

Japanese Patent Office Action, mailed Jul. 10, 2007 and issued in priority Japanese Patent Application No. 2003-204617.

* cited by examiner

*Primary Examiner*—Chun Cao
*Assistant Examiner*—Malcolm D Cribbs
(74) *Attorney, Agent, or Firm*—Staas & Halsey LLP

(57) ABSTRACT

A semiconductor integrated circuit device comprises an internal bus, a plurality of internal modules connected to the internal bus and including a main module performing a predetermined function, and a clock generating unit generating a reference clock and a clock sync signal which indicates positions of valid clock edges in the reference clock, the clock generating unit supplying the reference clock and the clock sync signal to the internal modules. At least one of the internal modules is provided with a sync control module which generates an internal clock based on the reference clock and the clock sync signal.

45 Claims, 28 Drawing Sheets

METHOD OF CONTROLLING DATA TRANSFER WITHIN A SEMICONDUCTOR INTEGRATED CIRCUIT BASED ON A CLOCK SYNC CONTROL SIGNAL

CROSS-REFERENCE TO RELATED APPLICATIONS

This application is based upon and claims the benefit of priority from the prior Japanese patent application No. 2003-204617, filed on Jul. 31, 2003, the entire contents of which are incorporated herein by reference.

BACKGROUND OF THE INVENTION

1. Field of The Invention

The present invention relates to a semiconductor integrated circuit device, a clock sync control method and a data transfer control method, which are provided for reducing power consumption of an internal module connected to a bus. More specifically, the present invention relates to a semiconductor integrated circuit device, a clock sync control method and a data transfer control method, which control the operating frequency of the internal module and the internal bus, and attain reduction of power consumption by controlling a clock and a clock sync signal.

2. Description of the Related Art

In recent years, with the development of high-speed, large-scale semiconductor processors, how to reduce the power consumption of the semiconductor processors has come to be the important subject.

As the method for reduction of power consumption of a semiconductor integrated circuit device, several measures have been taken by the conventional technology, which follows: 1) when the fast operation of the processor is unnecessary, the clock frequency is reduced dynamically; 2) the clocks with the operating frequencies according to the demands are respectively supplied to the internal modules within the processor; 3) the supply of the clock to the unnecessary module is stopped (which is controlled with the register, etc.); and 4) the power of the clock tree is reduced by using the gated clock.

The main power consumption factor P of a semiconductor processor is represented by the formula:

$$P = C \times V^2 \times F$$

(C: load capacity, V: source power voltage, F: operating frequency)

The above-mentioned methods are to reduce the power consumption by paying attention to the operating frequency F (or the switching probability of load capacity) in this formula.

There are many methods of attaining reduction of power consumption by controlling the source power voltage V. In recent years, however, the method of controlling the clock supply to the neighboring modules of which operation is not demanded attracts the attention.

Japanese Laid-Open Patent Application No. 2002-328744 discloses a device for preventing the deviation of clock synchronization to perform the data transfer between the modules when switching the clock frequency, as the conventional technology relevant to the present invention.

Japanese Laid-Open Patent Application No. 2003-58271 discloses a device and method for preventing the occurrence of the hang-up at the time of switching the clock frequency or shifting to the power down mode.

Japanese Laid-Open Patent Application No. 6-202754 discloses a device and method of carrying out the power down on the basis of the functional unit (module) of an integrated circuit. The state of each module is monitored, and, when the operation of the module is found unnecessary, the supply of the clock to the module is stopped.

Japanese Laid-Open Patent Application No. 8-194663 discloses a method of activating or deactivating the clock line characteristics for computer system and its peripheral bus. In this method, a command register for clock control is provided, and the clock control is carried out by stopping the supply of the clock to the module the operation of which is not needed.

Japanese Laid-Open Patent Application No. 2000-35886 discloses a method of attaining the synchronization of respective clocks using the latch when performing the signal switching between the respective modules which are operated in a case in which the ratio of the corresponding clocks is not an integral multiple.

SUMMARY OF THE INVENTION

One aspect of the present invention is a semiconductor integrated circuit device comprising: an internal bus; a plurality of internal modules connected to the internal bus and including a main module performing a predetermined function; and a clock generating unit generating a reference clock and a clock sync signal which indicates positions of valid clock edges in the reference clock, the clock generating unit supplying the reference clock and the clock sync signal to at least one of the plurality of internal modules, wherein at least one of the plurality of internal modules performs a predetermined internal processing based on the reference clock and the clock sync signal.

Another and a first aspect of the present invention is a semiconductor integrated circuit device comprising: an internal bus; a plurality of internal modules connected to the internal bus and including a main module performing a predetermined function; and a clock generating unit generating a reference clock and a clock sync signal which indicates positions of valid clock edges in the reference clock, the clock generating unit supplying the reference clock and the clock sync signal to at least one of the plurality of internal modules, wherein at least one of the plurality of internal modules is provided with a sync control module which generates an internal clock based on the reference clock and the clock sync signal.

Another and a second aspect of the present invention is a semiconductor integrated circuit device comprising: an internal bus; a first internal module connected to the internal bus and including a first main module performing a predetermined first function; a second internal module connected to the internal bus and including a second main module performing a predetermined second function, the second internal module performing data transfer with the first internal module via the internal bus; and a clock generating unit generating a first reference clock and supplying the first reference clock to the first internal module, the clock generating unit generating a second reference clock and a clock sync signal which indicates positions of valid clock edges in the second reference clock, corresponding to positions of clock edges in the first reference clock, and the clock generating unit supplying the second reference clock and the clock sync signal to the second internal module, wherein the first internal module performs data transfer according to the clock edges of the first reference clock when the first main module performs the first function according to the first reference clock, and the second internal module performs, when the second main module performs the second function according to the second reference clock, data transfer according to the valid clock edges of the second reference clock based on the clock sync signal and the second reference clock.

Another and a second aspect of the present invention is a semiconductor integrated circuit device comprising: an internal bus; a first internal module connected to the internal bus and including a first main module performing a predetermined first function; a second internal module connected to the internal bus and including a second main module performing a predetermined second function, the second internal module performing data transfer with the first internal module via the internal bus; and a clock generating unit generating a reference clock and a clock sync signal which indicates positions of valid clock edges in the reference clock, and supplying the reference clock and the clock sync signal to both the first internal-module and the second internal module, wherein the first internal module comprises an internal clock generating unit which generates an internal clock, which is supplied to the first main module, based on the reference clock and the clock sync signal, and the first internal module performs data transfer according to clock edges of the internal clock when the first main module performs the first function according to the internal clock, and the second internal module performs, when the second main module performs the second function according to the reference clock, data transfer according to the valid clock edges of the reference clock based on the clock sync signal and the reference clock.

Another and a third aspect of the present invention is a semiconductor integrated circuit device comprising: an internal bus; a first internal module connected to the internal bus and including a first main module performing a predetermined first function; a second internal module connected to the internal bus and including a second main module performing a predetermined second function, the second internal module performing data transfer with the first internal module via the internal bus; and a clock generating unit generating a first reference clock and a first clock sync signal which indicates positions of valid clock edges in the first reference clock, and supplying the first reference clock and the first clock sync signal to the first internal module, and the clock generating unit generating a second reference clock and a second clock sync signal which indicates positions of valid clock edges in the second reference clock, and supplying the second reference clock and the second clock sync signal to the second internal module, wherein the first internal module performs data transfer according to the valid clock edges of the first reference clock based on the first clock sync signal and the first reference clock when the first main module performs the first function according to the first reference clock, and the second internal module performs, when the second main module performs the second function according to the second reference clock, data transfer according to the valid clock edges of the second reference clock based on the second clock sync signal and the second reference clock.

According to the first aspect of the present invention, it becomes possible to reduce the redundant power consumption in the power consumption in the clock tree, and the module connected to the clock tree. It is effective for the reduction of power consumption in semiconductor integrated circuit devices, such as system-on-chip which has the internal module which carried two or more function IP macro sets.

Moreover, according to the second and third aspects of the present invention, operation can be made possible at the desired operating frequency, without carrying out the very high-speed signal transfer between the modules which operate with each clock, even when the corresponding clock ratio is not the integral multiple.

According to the semiconductor integrated circuit device of the present invention, it is possible to reduce the redundant power consumption in the power consumption in the clock tree, and the module connected to the clock tree.

It is effective for the reduction of power consumption in semiconductor integrated circuit devices, such as system-on-chip which has the internal module which carried two or more function IP macro sets.

Moreover, it becomes possible to operate the processor by the desired operating frequency, without carrying out the very high-speed signal transfer between the modules which operate with each clock, when there is no clock ratio of the corresponding high-speed clock and the low-speed clock at the integral multiple according to the clock sync control system of the present invention.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

Figure 1:
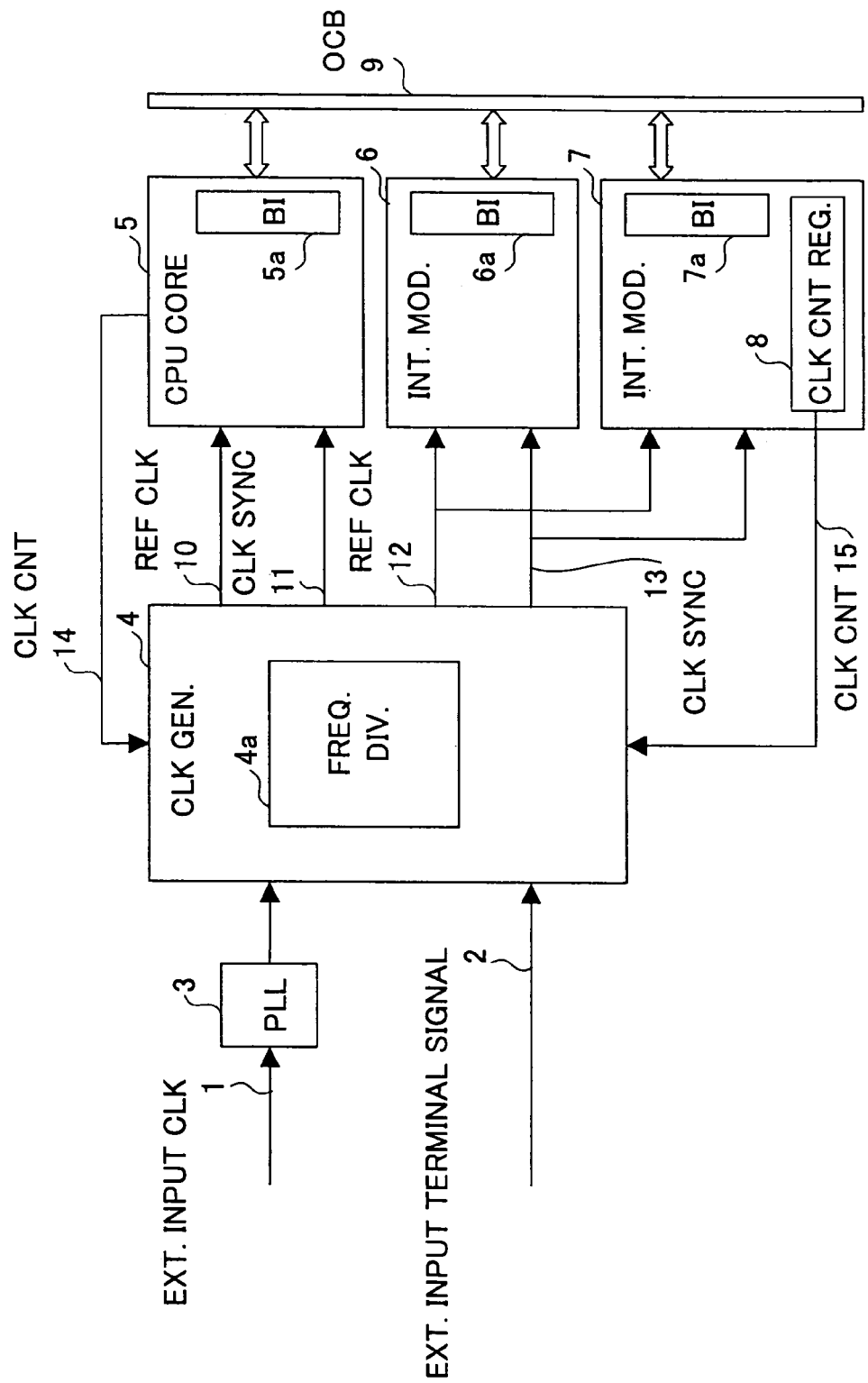
FIG. 1 is a block diagram of the composition of a processor to which an embodiment of the semiconductor integrated circuit device of the invention is applied.

With the recent progress of system LSI development, the development of system-on-chip (SOC) in which a number of function IP macro sets (the functional units for realizing the specific functions) are carried on a single chip is possible. As the circuit scale grows large, the power consumption becomes larger accordingly. Therefore, how the power consumption is reduced is the important subject.

The system-on-chip (SOC) is usually provided with the internal modules in which many function macro sets are carried. As the measure against the power consumption of the internal modules, the conventional method utilizes the register which indicates whether the operation of each module is activated or not. In the conventional method, when it is detected that a specific module is in inactive state (which indicates the operation thereof is impossible or unnecessary) using the register, the supply of the clock to the module is stopped or turned OFF.

However, in the conventional method, once the supply of the clock to a specific module is activated or turned ON, the supply of the clock to the module will be continued regardless of whether a bus access is presented to the module or in which state the operation of the module itself is.

When it is taken into consideration that about 10 to 30% of the power consumption of a semiconductor chip (the value of which depends on the circuit arrangement of the chip) is consumed by the clock tree (the group of buffers inserted in a tree-like formation for adjustment of clock skew), it is desired to stop or inhibit the redundant clock supply when the function IP macro is not operated.

In other words, even if the unnecessary signal transition of the data bus and arithmetic elements is suppressed by using the gated clock etc., the unnecessary power consumption in the clock tree will be continued.

If the gated clock etc. is not used, the unnecessary power consumption will be continued more notably. It is desired that the reduction of power consumption of the semiconductor chip be attained by reducing the redundant power consumption.

Furthermore, in a semiconductor processor provided with various internal modules, such as a CPU core, a SDRAM controller, a peripheral-bus controller, a timer, etc., it is required that the internal modules always provide some processing capability while the CPU operates at high speed.

In such a semiconductor processor, the clock with the minimum frequency necessary for the processing of the application program is supplied. And in order to satisfy the requirement of achieving the maximum performance according to the conditions, such as the process results (manufacturing variation), the source power voltage, and the temperature, there is the case in which the ratio of the frequencies of a first clock and a second clock, supplied to the CPU core and the internal module respectively, is set to a non-integral multiple (for example, 1.5 or 2.5).

To satisfy the requirement, a clock generating unit of the processor generates the first and second clocks with the frequencies the ratio of which is set to the non-integral multiple. When such clocks are supplied to the internal modules including the CPU core and the clock edges of each clock are at equal intervals, there is the problem that the signal synchronization circuit for the internal modules must operate at the frequency that doubles the frequency of the faster clock.

The signal synchronization circuit which must operate at extremely high speed will become a significant problem on the logic design, the layout, and the timing verification in the LSI development.

An object of the present invention is to provide an improved semiconductor integrated circuit device in which the above-described problems are eliminated.

Another object of the present invention is to provide a semiconductor integrated circuit device and clock sync control method in which the redundant clock supply is detected by the presence of a bus access to the internal module, and when the internal module is in active state but the actual operation of the internal module is not needed, the function to stop or inhibit the supply of the clock to the internal module is provided.

Another object of the present invention is to provide a semiconductor integrated circuit device and clock sync control method in which the function to realize the clock synchronization between the internal modules which operate with the clocks with a non-integral multiple ratio is attained by a simplified method.

A description will now be given of the preferred embodiments of the present invention with reference to the accompanying drawings.

FIG. 1 shows the fundamental composition of a processor to which one embodiment of the semiconductor integrated circuit device of the invention is applied.

In the composition of FIG. 1, reference number 1 indicates an external input clock, 2 indicates an external input terminal signal for performing clock control, and 3 indicates a PLL (phase-locked loop) circuit which generates an input clock supplied to the clock generating unit in this embodiment. Reference numeral 4 indicates the clock generating unit in this embodiment, 4*a* indicates a frequency divider in the clock generating unit 4, 5 indicates the CPU core in this embodiment, and 5a indicates a bus interface (BI) in the CPU core 5.

Moreover, in the composition of FIG. 1, reference numeral 6 indicates an internal module in this embodiment, 6a indicates a bus interface (BI) in the internal module 6, 7 indicates an internal module in this embodiment, 7a indicates a bus interface (BI) in the internal module 7, 8 indicates a clock control register in the internal module 7, and 9 indicates an internal on-chip bus (OCB) in this embodiment.

Moreover, in the composition of FIG. 1, reference numeral 10 indicates a high-speed reference clock (bus clock) supplied to the CPU core 5 in this embodiment, 11 indicates a clock sync signal corresponding to the reference clock 10 and supplied to the CPU core 5 in this embodiment, 12 indicates a low-speed reference clock supplied to the internal modules 6 and 7 in this embodiment, and 13 indicates a clock sync signal corresponding to the reference clock 11 and supplied to the internal modules 6 and 7 in this embodiment. Reference numeral 14 indicates a clock control signal supplied from the CPU core 5 to the clock generating unit 4 according to the program instruction in this embodiment, and 15 indicates a clock control signal supplied from the clock control register 8 to the clock generating unit 4 in this embodiment.

The semiconductor integrated circuit device of this embodiment is applied to the processor of FIG. 1. The processor of FIG. 1 includes the internal on-chip bus (OCB) 9, the PLL circuit 3, the clock generating unit 4, the CPU core 5, the internal module 6, and the internal module 7. The semiconductor integrated circuit device of this embodiment includes the internal on-chip bus 9, the clock generating unit 4 and the internal modules 6 and 7.

The PLL circuit 3 receives the external input clock 1, and outputs a PLL output signal, which is synchronized with the external input clock 1, to the clock generating unit 4.

The clock generating unit 4 receives the PLL output signal from the PLL circuit 3 and receives the external input terminal signal 2 through the external input terminal. Moreover, the clock generating unit 4 receives the clock control signal 14 from the CPU core 5, and uses the received clock control signal 14 for clock sync control.

Moreover, the clock generating unit 4 receives the clock control signal 15 from the clock control register 8, which is provided in the internal module 7, and uses the received clock control signal 15 for clock sync control.

The CPU core 5, the internal module 6, and the internal module 7 are connected to the on-chip bus 9 through the bus interface 5a, the bus interface 6a, and the bus interface 7a, respectively.

Each of the CPU core 5 and the internal modules 6 and 7 generates an internal clock with the frequency, which is suitable for the internal operation of the module, based on the received reference clock and the received clock sync signal.

Figure 2:
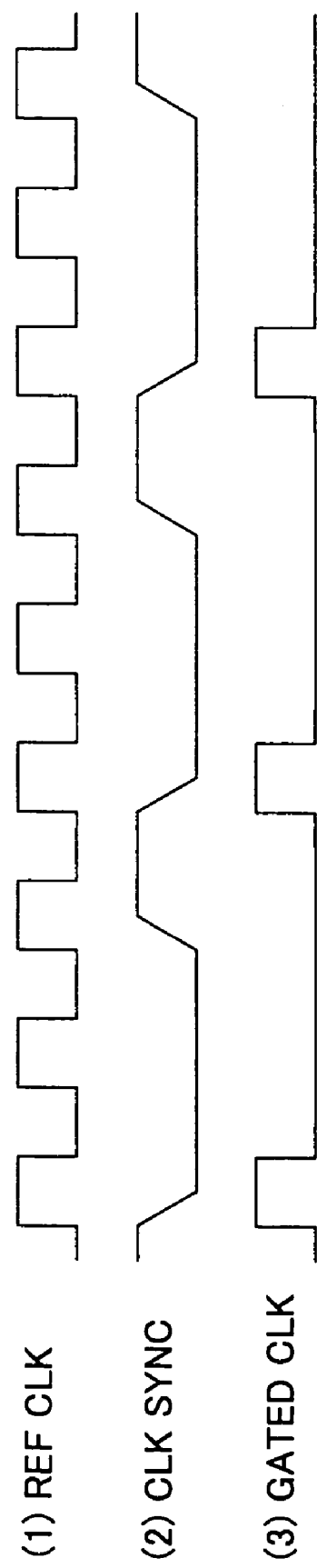
FIG. 2 is a waveform diagram for explaining a reference clock and a clock sync signal.

FIG. 2 is a waveform diagram for explaining the reference clock and the clock sync signal in the present embodiment.

In FIG. 2, (1) indicates the reference clock in this embodiment, (2) indicates the clock sync signal in this embodiment, and (3) indicates the gated clock (internal clock) which is generated using the reference clock and the clock sync signal in this embodiment.

As shown in FIG. 2, the gated-clock (internal clock) (3) in this embodiment is generated by handling the plurality of pulses of the reference clock (1) so as to pass only the reference-clock pulses the rising edge of which (a transition from LOW level to HIGH level) accords with a HIGH-level period of the clock sync signal (2). The gated clock (internal clock) (3) generated in this manner has a frequency that is lower than the frequency of the reference clock (1), and the frequency of the internal clock is changed by changing the period or duty ratio of the clock sync signal (2).

Figure 3:
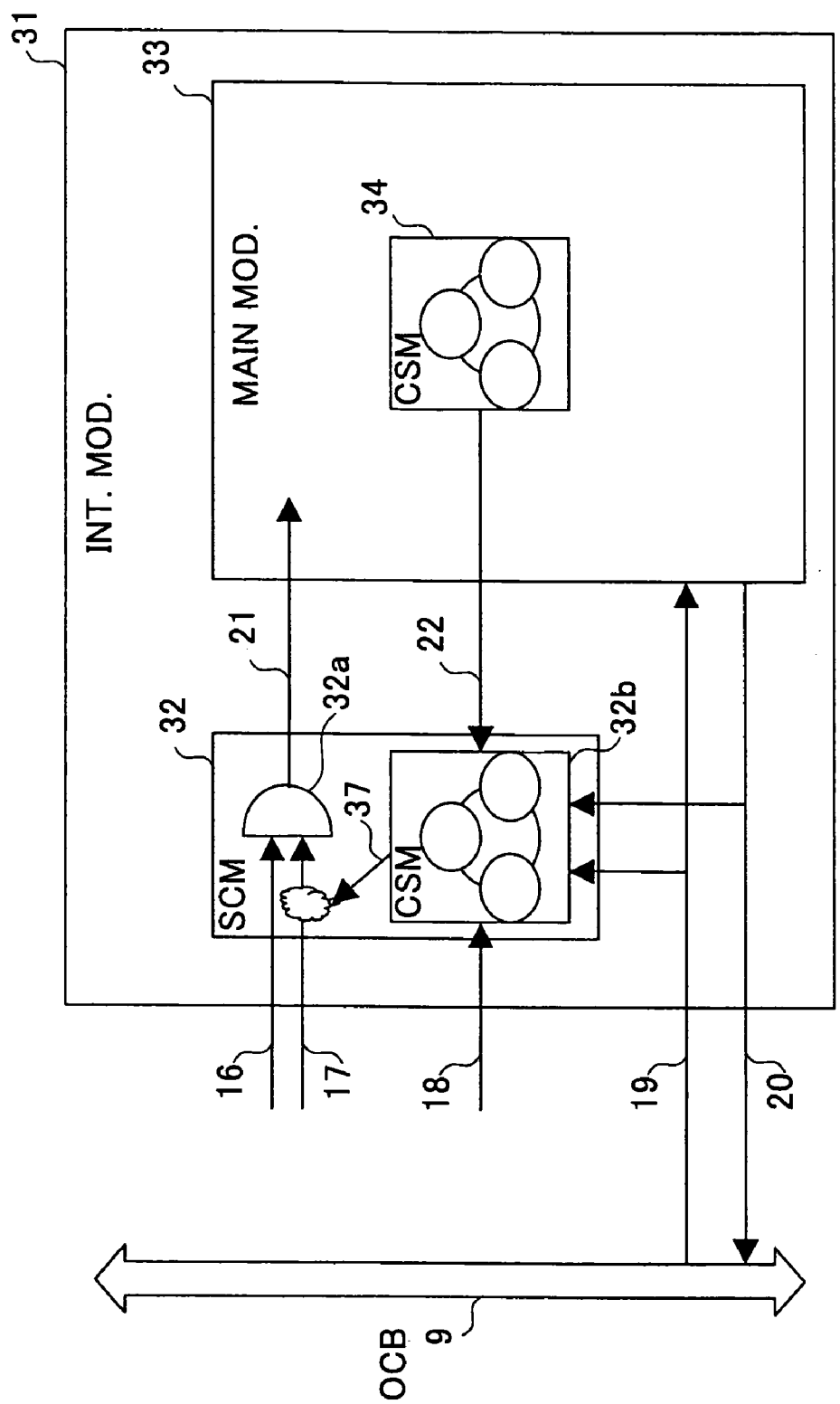
FIG. 3 is a block diagram of an embodiment of the internal module in the semiconductor integrated circuit device of the invention.

FIG. 3 shows an embodiment of the internal module in the semiconductor integrated circuit device of the invention.

In the embodiment of FIG. 3, reference numeral 31 indicates the internal module which is connected to the on-chip bus (OCB) 9 and has a specific function, 32 indicates a sync control module (SCM) which generates the gated clock (internal clock) in the internal module 31, 33 indicates a main module which carries out the specific function of the internal module 31, and 34 indicates a control state machine of the main module 33.

Moreover, in the embodiment of FIG. 3, reference numeral 16 indicates the reference clock, 17 indicates the clock sync signal, 18 indicates a request signal, such as an interrupt request or DMA (direct memory access) request sent to the internal module 31, and 19 indicates a bus request signal which is defined by the bus protocol of the on-chip bus 9. Reference numeral 20 indicates a bus acknowledge signal which is defined by the bus protocol of the on-chip bus 9, and 21 indicates the gated clock (internal clock) which is generated by the sync control module 32 using the reference clock 16 and the clock sync signal 17.

Moreover, in the embodiment of FIG. 3, reference numeral 22 indicates a clock control signal which is notified to the sync control module 32 from the control state machine 34 of the main module 33. The clock control signal 22 is, for example, a state signal indicating that the control state of the main module 33 is IDLE state. Reference numeral 32a indicates a logic circuit which is provided in the sync control module 32 to generate the gated clock 21, and 32b indicates a control state machine of the sync control module 32. Reference numeral 37 indicates an internal clock control signal which is outputted from the control state machine 32b and controls the input of the clock sync signal 17 to the logic circuit 32a.

The sync control module (SCM) 32 in this embodiment generates the internal clock 21 based on the reference clock 16, the clock sync signal 17, and the internal clock control signal 37, and outputs the internal clock 21 from the logic circuit 32a. The main module 33 performs a predetermined processing in accordance with the internal clock 21 received from the sync control module 32. A detailed description of the sync control module 32 is given later.

Referring back to FIG. 1, the clock generating unit 4 generates the high-speed reference clock 10 (bus clock) and the low-speed reference clocks 12 (supplied to the internal modules). At the same time, in order to achieve the clock synchronization of the reference clock 10, the clock generating unit 4 generates the clock sync signal 11 and supplies the clock sync signal 11 to the CPU core 5. Moreover, in order to achieve the clock synchronization of each low-speed reference clock 12, the clock generating unit 4 generates the clock sync signals 13, each having a period that is set to a given multiple of the period of the reference clock 12, and supplies the clock sync signals 13 to the internal modules of the processor respectively.

The number of signal pairs of the reference clock and its corresponding clock sync signal may be single or plural. Moreover, the clock sync signal 13 may be asserted just before the required clock edge or may precede the reference clock by one cycle.

In the semiconductor integrated circuit device of the invention, the synchronization control between the signals generated by the clocks of the different frequencies is carried out by using the reference clocks 10 and 12 and the clock sync signals 11 and 13 in the clock interface control circuits (for example, the bus interface, the bus bridge, etc. in each internal module).

The semiconductor integrated circuit device of the invention is applied to the processor provided with the clock generating unit 4 as shown in FIG. 1, and characterized by providing the sync control module (SCM), which generates the internal clock, for each of the internal modules which receive the reference clock and the clock sync signal.

The semiconductor integrated circuit device of the invention has a controlling mechanism for controlling ON/OFF of the supply of the clocks to the internal modules and controlling the variation of the ration of the frequencies of the reference clocks supplied to the internal modules. Specifically, such control is carried out by using the external terminals of LSI, the internal clock control registers, or the instructions in the instruction set of the processor, etc.

Alternatively, the clock generating unit in the processor may be provided with the mechanism for selectively stopping the supply of the reference clocks and the clock sync signals or changing the frequency of each reference clock (see Japanese Laid-Open Patent Application No. 2003-58271). Moreover, the clock generating unit in the processor may be provided with the mechanism for performing a handshake control with the various modules before starting the clock control (see Japanese Laid-Open Patent Application No. 2002-328744).

According to one embodiment of the semiconductor integrated circuit device of the invention, the sync control module is provided in each of the internal modules connected to the bus, and the sync control module generates the internal clock in each internal module. The sync control module is provided with the function to stop the supply of each internal clocks or the function to slow down the supply of each internal clock. Each of the internal modules connected to the bus is inclusive of the bus master and the bus slave.

A description will be given of the method of stopping the supply of the internal clocks when there is no bus access.

Figure 4:
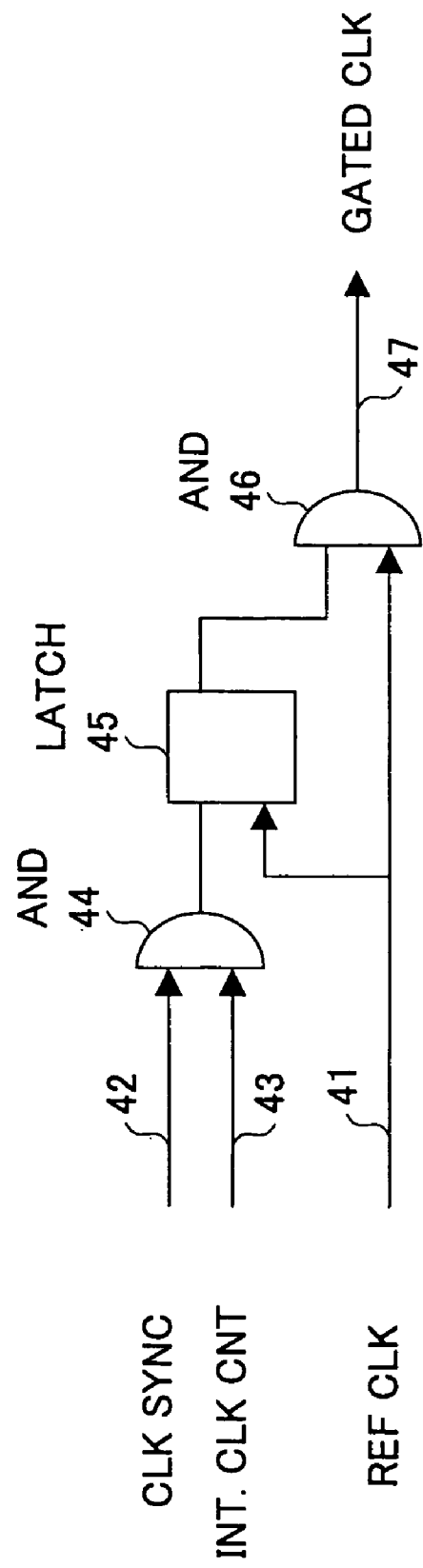
FIG. 4 is a circuit diagram of a sync control module in the embodiment of FIG. 3.

FIG. 4 shows an example of the sync control module (SCM) in the embodiment of FIG. 3. In FIG. 4, reference numeral 41 indicates the reference clock, 42 indicates the clock sync signal, 43 indicates the internal clock control signal generated in the sync control module. Reference numeral 44 indicates the AND element for masking the clock sync signal 42 by the clock control signal 43, 45 indicates the latch cell, 46 indicates the AND element for generating the gated clock from the output signal of the latch cell 45 and the reference clock 41, and 47 indicates the generated gated clock.

Figure 5:
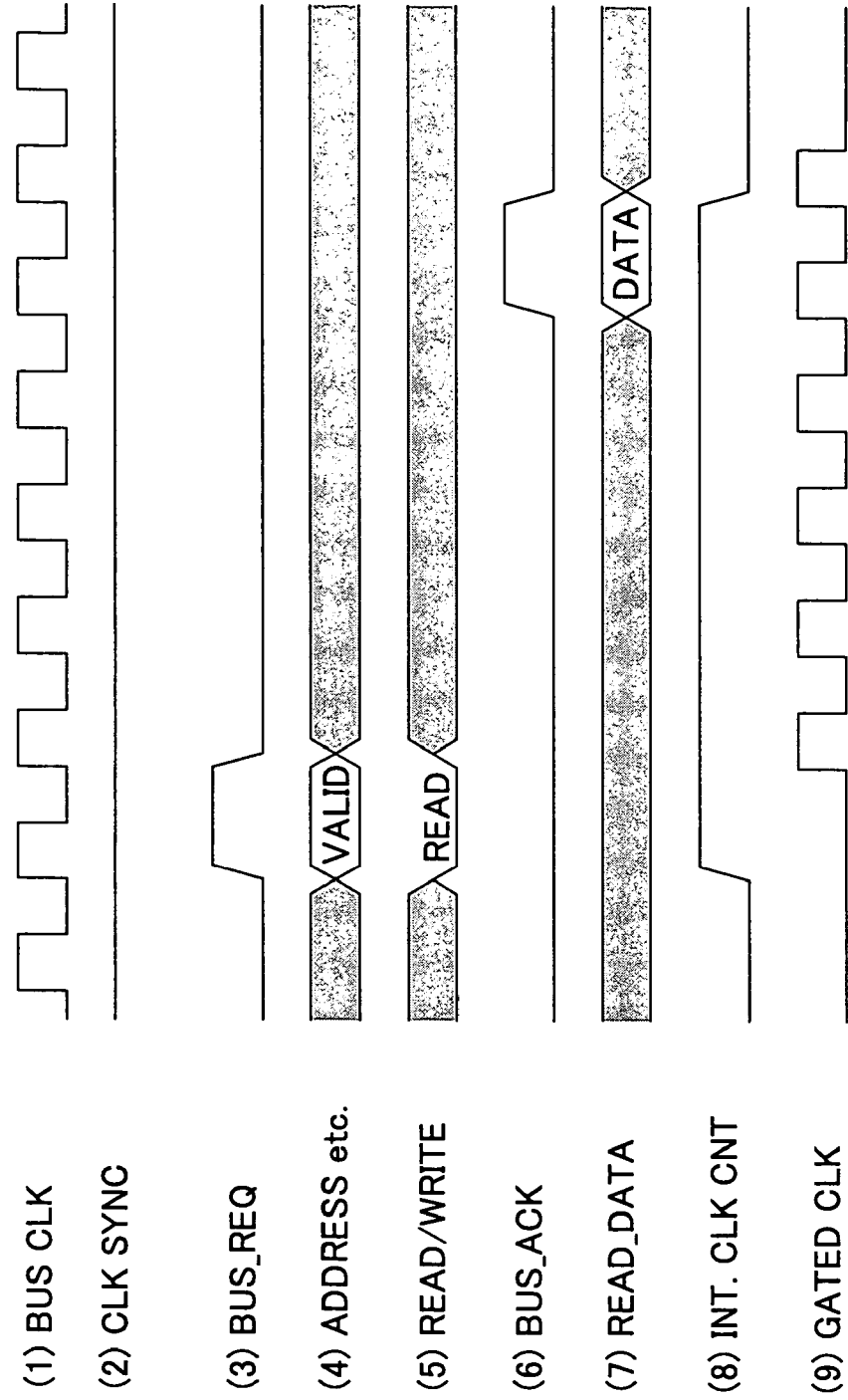
FIG. 5 is a waveform diagram for explaining operation of the sync control module in the embodiment of FIG. 4.

FIG. 5 is a waveform diagram for explaining operation of the sync control module of FIG. 4. In FIG. 5, (1) indicates the reference clock 41 (bus clock) of FIG. 4, (2) indicates the clock sync signal 42 of FIG. 4 (which is set to HIGH level fixedly, indicating the fastest clock in this case), (3) indicates the bus request signal (bus_req), (4) indicates the address phase signal as in the pipelined bus, (5) indicates the read/write signal (read/write) which indicates whether the transfer on the bus is caused by reading or writing, (6) indicates the bus acknowledge signal (bus_ack), (7) indicates the read data (read_data) which is returned to the bus, (8) indicates the internal clock control signal which is generated in response to one of the request signals, such as the interrupt request or the DMA request in the sync control module 32, the clock control signal received from the control state machine 34 of the main module 33, the bus request signal, and the bus acknowledge signal, and (9) indicates the gated clock which is generated based on the reference clock, the clock sync signal, and the internal clock control signal.

By using the circuit arrangement shown in FIG. 3 and FIG. 4, the sync control module which generates the internal clock is provided in the internal module connected to the bus. By using the sync control module, the internal clock sent to the related internal module is generated from the reference clock (bus clock) received from the clock generating unit 4, the clock sync signal, and the internal clock control signal generated in the internal module.

As shown in FIG. 5, starting/stopping the supply of the internal clock (9) to the internal module is controlled by setting the ON/OFF of the supply of the clock sync signal (2) to the gated-clock generating unit by the internal clock control signal (8).

In the example of FIG. 5, the clock sync signal is set to HIGH level fixedly, which indicates that it has the same frequency as that of the reference clock. Alternatively, as shown in FIG. 2, the period of the clock sync signal may be set to be a given multiple of the period of the reference clock and the duty ratio may be set appropriately, so that the frequency of the internal clock may be set to be a predetermined value that is lower than the frequency of the reference clock.

Using the bus request signal (which indicates the occurrence of the bus transfer), the external interrupt request signal, or the DMA (direct memory access) request signal, etc., the control state machine 32b of the sync control module 32 determines the period in which the internal module concerned must carry out normal operation. In the period in which the normal operation of the internal module concerned is unneeded, the control state machine 32b negates the internal clock control signal, so that the masking of the clock sync signal is carried out and the supply of the internal clock is stopped. On the other hand, in the period in which the normal operation is needed, the control statemachine 32b asserts the internal clock control signal, and supplies the internal clock control signal to the gated-clock generating unit without carrying out the masking of the clock sync signal, so that the internal clock (the gated clock) is generated.

Concerning the determination of the period in which the normal operation is needed by the sync control module, the timing to start the supply of the internal clock (or the timing to assert the internal clock control signal) may be determined by using the timing that the bus request is generated or the timing that a certain request signal such as an external interrupt request signal is asserted.

It is necessary to take into consideration the timing to stop the supply of the internal clock (or the timing to negate the internal clock control signal. Specifically, when the internal module to which the internal clock is supplied is a simple register file etc., the timing to stop the supply of the internal clock is determined by using the timing that the end of the bus transfer is detected by the bus acknowledge signal indicating the end of bus access, and the subsequent supply of the internal clock thereafter will be stopped.

However, in the case of the internal module which needs to continuously perform operation during a certain period after the end of bus access, the timing to stop the supply of the internal clock cannot be determined by using the bus acknowledge signal only.

To overcome the problem, the sync control module which generates the internal clock being supplied to the internal module which needs to continuously perform operation during a certain period after the end of bus access must be provided with the mechanism for monitoring the operating state of the internal module by a specific signal and determining the timing to stop the supply of the internal clock by the end of the operation of the internal module. In other words, the supply of the internal clock to the internal module must be continued until the end of the operation of the internal module is detected.

In the example of FIG. 5, the internal clock control signal (8) is asserted in response to the rising edge of the bus request signal (3) (bus_req), and the internal clock control signal (8) is negated in response to the falling edge of the bus acknowledge signal (6) (bus_ack).

The signal used to monitor the operating state of the internal module is, for example, the clock control signal 22 which indicates the IDLE state of the internal module. This clock control signal 22 is outputted from the control state machine 34 of the main module 33 to the sync control module 32. The control state machine 34 controls the interior action of the internal module 31.

Next, a description will be given of an example of the method of slowing down the supply of the internal clocks when there is no bus access.

Figure 6:
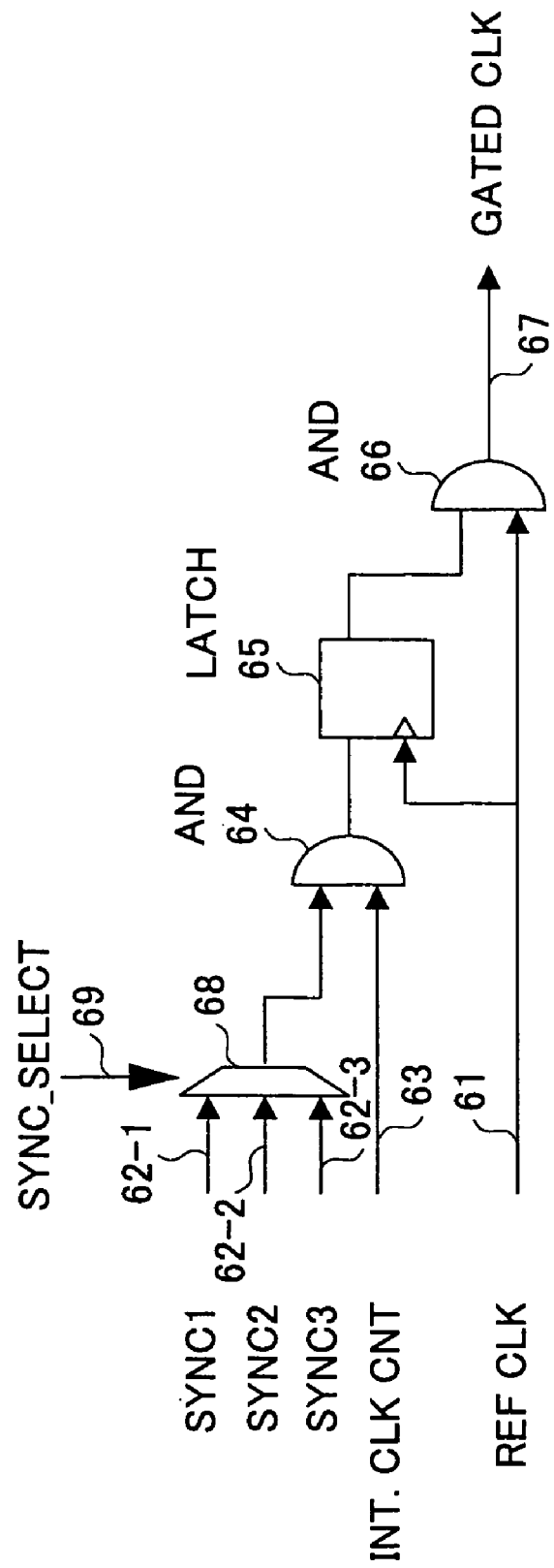
FIG. 6 is a circuit diagram of another embodiment of the sync control module in the semiconductor integrated circuit device of the invention.

FIG. 6 shows an example of the sync control module (SCM) in the semiconductor integrated circuit device of the invention. In FIG. 6, reference numeral 61 indicates the reference clock, 63 indicates the internal clock control signal which is generated in the sync control module 32, and 64 indicates the AND element for masking the clock sync signal, selected when the internal clock is unneeded, by the clock control signal 63. Reference numeral 65 indicates the latch cell, and 66 indicates the AND element for generating the gated clock (internal clock). Reference numeral 67 indicates the gated clock which is generated, 62-1 indicates the clock sync signal (sync1) which indicates a specific clock speed, 62-2 indicates the clock sync signal (sync2) which indicates a specific clock speed, and 62-3 indicates the clock sync signal (sync3) which indicates a specific clock speed. Reference numeral 68 indicates the selector circuit, and 69 indicates the selection signal (sync select) for selecting one of the clock sync signals 62-1 to 62-3 with different clock speeds. This selection signal 69 is generated in the sync control module 32.

The method of slowing down the supply of the internal clock in the embodiment of FIG. 6 is realized with the selector circuit 68 which selects two or more clock sync signals in response to the selection signal 69. The clock generating unit 4 in the processor supplies the reference clock 61 and the clock sync signals 62-1 to 62-3, which indicate different clock frequencies, to the sync control unit 32. The sync control module 32 generates the internal clock to be supplied to the internal module concerned. In the sync control module 32, the selector circuit 68 selects the clock sync signal according to the clock frequency suitable for operation of the internal module concerned. Then, the sync control module 32 generates the internal clock of frequency suitable for operation of the internal module based on the selected clock sync signal, the internal clock control signal, and the reference clock. The selection signal 69 is supplied to the selector circuit 68 from the clock generating unit 4, for example.

The timing to start the supply of the internal clock and the timing to stop the supply of the internal clock in the method of the present embodiment may be determined in the same manner as described above with reference to FIG. 4 and FIG. 5. Moreover, in the method of the present embodiment, selecting the LOW clip signal which indicates the timing to stop the supply of the internal clock may be included as a variation of selecting the clock sync signal in the sync control module 32.

Next, a description will be given of another example of the method of slowing down the supply of the internal clocks when there is no bus access.

Figure 7:
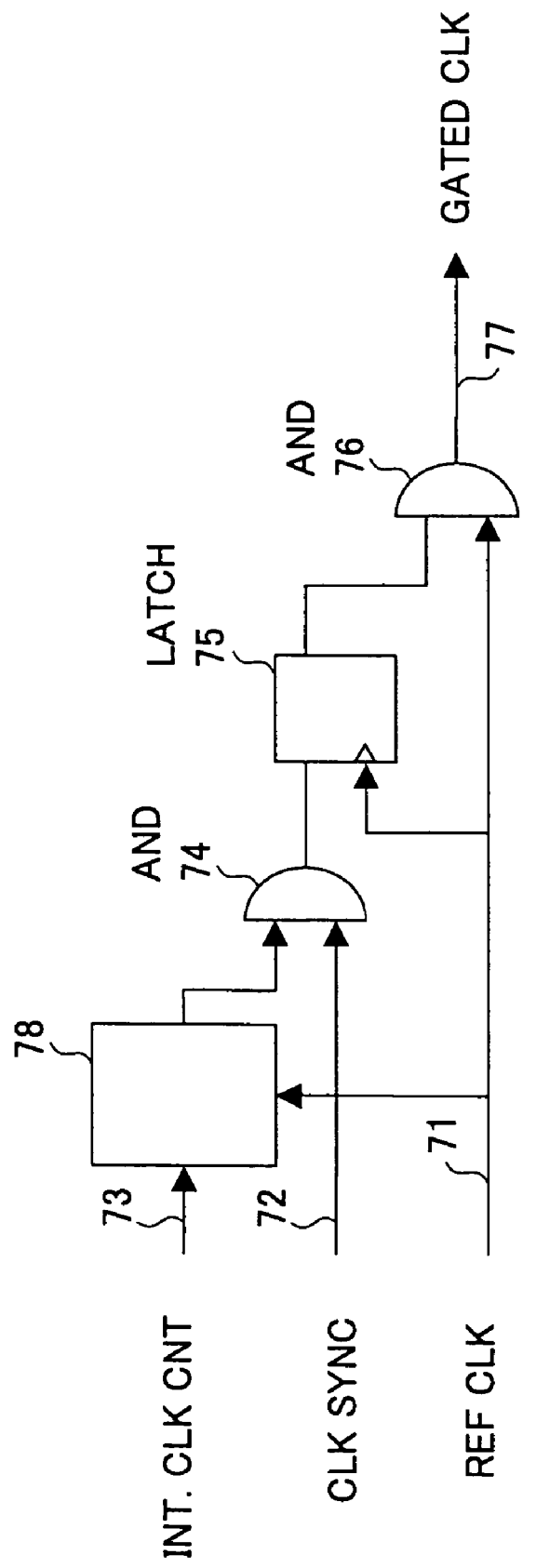
FIG. 7 is a circuit diagram of another embodiment of the sync control module in the semiconductor integrated circuit device of the invention.

FIG. 7 shows another embodiment of the sync control module in the semiconductor integrated circuit device of the invention. In FIG. 7, reference numeral 71 indicates the reference clock, 72 indicates the clock sync signal, and 73 indicates the internal clock control signal which is generated within the sync control module 32. Reference numeral 74 indicates the AND element for masking the clock sync signal 72 further with the mask signal, generated by the counter 78, when the supply of the internal clock is unneeded. Reference numeral 75 indicates the latch cell, 76 indicates the AND element for generating the internal clock (or the gated clock), 77 indicates the gated clock which is generated, and 78 indicates the counter for generating the mask signal in order to slow down or stop the supply of the internal clock.

The method in the embodiment of FIG. 7 is realized by skipping the clock sync signal that is used to generate the internal clock, with the mask signal supplied from the counter 78.

Specifically, the clock generating unit 4 provided in the processor supplies the reference clock 71 and the clock sync signal 72 accorded to the maximum speed of the operation of the internal module, to the internal module to which the internal clock is supplied. When it is determined by the sync control module 32 that the internal module of concern does not require operation, the counter 78 outputs to the AND element 74 the mask signal which is set to LOW level fixedly. By receiving the mask signal from the counter 78, the AND element 74 performs the masking of the clock sync signal 72 so that the supply of the internal clock to the internal module of concern is stopped. Otherwise, the counter 78 outputs to the AND element 74 the mask signal which has a given constant period or duty ratio. By receiving the mask signal from the counter 78, the AND element 74 is caused to skip the clock sync signal 72 at a fixed rate so that the supplying speed of the internal clock is slowed down. The clock slow-down method of the present embodiment is useful for reducing the power consumption of the semiconductor integrated circuit device.

In the clock slowdown-method of the present embodiment, as an effective method of skipping the clock sync signal, the output signal of the counter 78 having the constant duty ratio is used to carry out the masking of the clock sync signal 72 for a fixed period.

The counter 78 is operated based on the internal clock control signal 73 and the reference clock 71. An example of operation of the counter 78 is described below.

The internal clock control signal 73 functions as an enable signal of the counter 78. The counter 78 includes an up counter or a down counter, and performs counting operation in response to the reference clock 71. When the counter 78 is set in the enable state (or when the internal clock control signal 73 is set to HIGH level), the counter 78 compares the current count value with a predetermined reference value, and outputs the mask signal which is set to HIGH level (or LOW level) according to the comparison result. Thus, the signal outputted to the AND element 74 by the counter 78 functions as the mask signal having the fixed period or duty ratio which is used for the masking of the clock sync signal by the AND element 74.

In the present embodiment, the period or the duty ratio of the mask signal can be changed by changing the internal setting (the reference value of the comparison or the upper limit of the currently counted value) of the counter 78. Moreover, the counter 78 outputs the mask signal which is set to LOW level fixedly, when the counter 78 is set in the disable state (or when the internal clock control signal 73 is set to LOW level).

Moreover, selecting the LOW clip signal which indicates the stop of the supply of the internal clock may also be included as a variation of the clock sync signal used in the sync control module 32.

Next, a description will be given of another example of the method of slowing down the supply of the internal clocks when there is no bus access.

Figure 8:
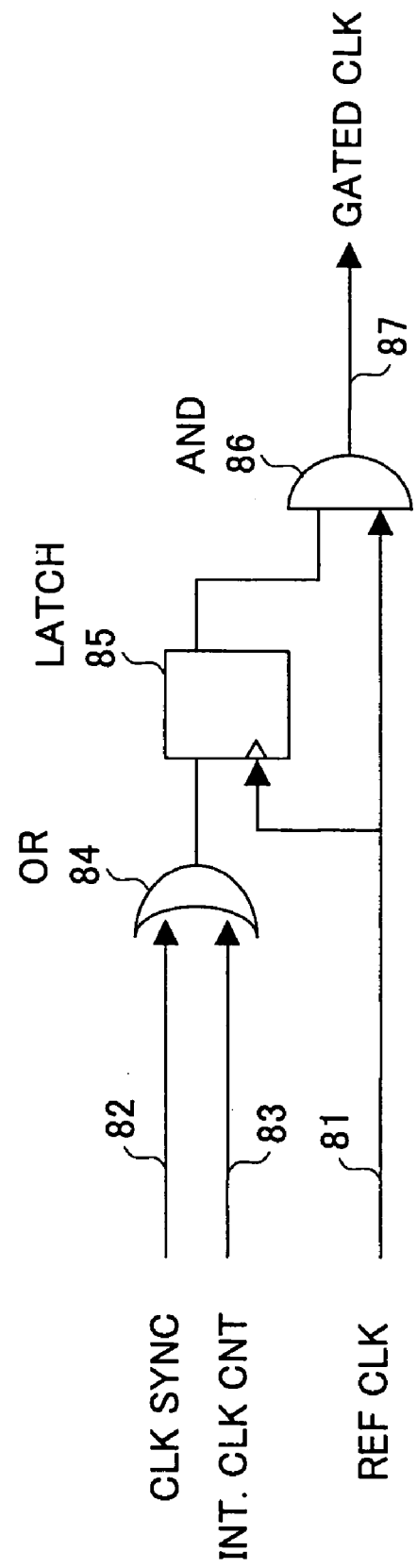
FIG. 8 is a circuit diagram of another embodiment of the sync control module in the semiconductor integrated circuit device of the invention.

FIG. 8 shows another embodiment of the sync control module in the semiconductor integrated circuit device of the invention. In FIG. 8, reference numeral 81 indicates the reference clock, 82 indicates the clock sync signal (in this example, the low-speed clock sync signal), and 83 indicates the internal clock control signal which is generated within the sync control module 32. Reference numeral 84 indicates the OR element for generating the high-speed internal clock by HIGH masking the low-speed clock sync signal 82 with the internal clock control signal 83. Reference numeral 85 indicates the latch cell, 86 indicates the AND element for generating the internal clock (the gated clock), and 87 indicates the gated clock which is generated.

The method in the embodiment of FIG. 8 is realized by generating the low-speed internal clock using the low-speed clock sync signal when the internal module of concern does not perform operation (at the time of defaults), and generating the high-speed internal clock using the HIGH-mask signal when the internal module of concern does perform operation.

Specifically, the clock generating unit 4 provided in the processor supplies the reference clock 81 and the low-speed clock sync signal 82 to the internal module of concern to which the internal clock is supplied. The sync control module 32 of each internal module sets the internal clock control signal to LOW level fixedly when the internal module of concern does not require operation. By receiving the reference clock 81 and the low-speed clock sync signal 82 without change, the AND element 86 generates the low-speed internal clock. Hence, the sync control module 32 of the present embodiment slows down the supply of the internal clock to the internal module, in order to attain reduction of the power consumption of the semiconductor integrated circuit device.

Otherwise, the sync control module 32 performs the LOW masking of the low-speed clock sync signal by using the logical element (not shown), so that the supply of the internal clock to the internal module of concern is stopped in order to attain reduction of the power consumption of the semiconductor integrated circuit device.

When the internal module of concern requires normal operation, the sync control module 32 sets the internal clock control signal to HIGH level fixedly, and performs the HIGH masking of the clock sync signal with the internal clock control signal so that the reference clock 81 is outputted without change to the internal module of concern as the high-speed internal clock.

Moreover, similar to the previous embodiment, the counter or the like may be also provided in the internal module of concern in the present embodiment of FIG. 8. In such alternative embodiment, in order obtain a longer HIGH period of the internal clock (or a longer clock active period) than that of the low-speed clock sync signal, it is possible to generate the high-speed internal clock by performing the masking of the clock sync signal (or by taking the logical OR) with the counter It is assumed that, in the embodiment of FIG. 8, when the clock sync signal is at HIGH level, the gated-clock which is generated at the next clock edge of the reference clock is outputted. In the alternative embodiment in which the masking of the clock sync signal with the internal clock control signal, the logic OR of the clock sync signal received from the clock generating unit and the mask signal (or the internal clock control signal) is taken. Thus, it is possible to obtain the control signal for generating the internal clock (or the enable signal to the gated-clock buffer which generates the internal clock) in order to generate the required clock frequency.

Concerning the determination of the timing to start the supply of the internal clock or the timing to stop the supply of the internal clock for use in the method of the present embodiment, the same method as described above with reference to FIG. 4 and FIG. 5 may be used, and a description thereof will be omitted.

Next, a description will be given of another embodiment of the sync control module in the semiconductor integrated circuit device of the invention.

In the present embodiment, the internal clock generating unit (or the sync control module) which supplies the internal clock to each internal module is provided in the pipelined or crossbar bus, and the method of supplying the internal clock to the related bus master and/or bus slave when there is a bus transfer request, is explained below.

Figure 9:
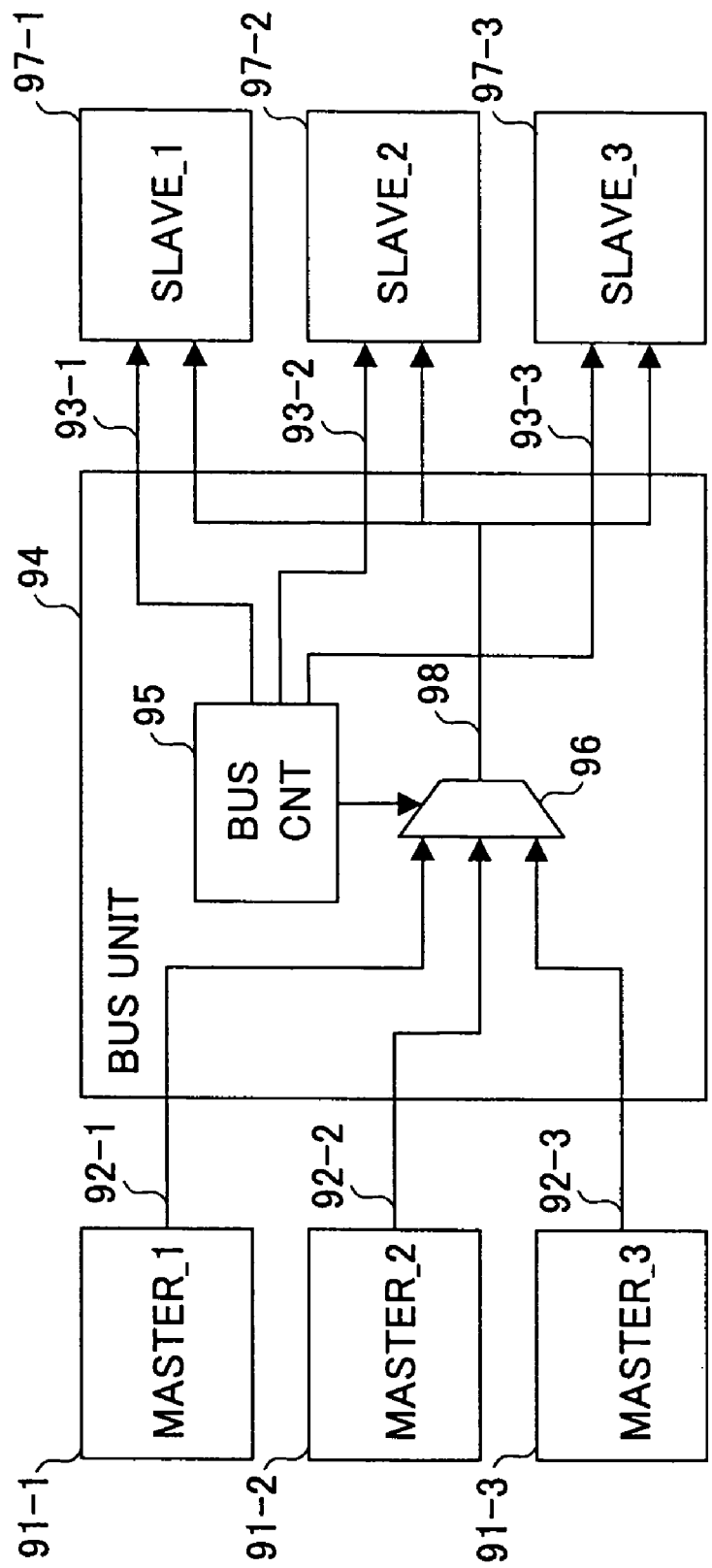
FIG. 9 is a block diagram for explaining an embodiment of the clock sync control method of the invention.

First, the clock sync control method of this embodiment is applied to the pipelined bus. FIG. 9 shows an embodiment of the clock sync control method of the invention.

In FIG. 9, reference numeral 91-1 indicates the bus master (master_1), 91-2 indicates the bus master (master_2), and 91-3 indicates the bus master (master_3) in the present embodiment. Reference numeral 94 indicates the bus unit which has a specific bus protocol, 95 indicates the bus control unit which is provided in the bus unit 94, and 96 indicates the selector circuit which selects one of the data signals received from the bus masters 91-1 to 91-3 and outputs the selected data signal. Reference numeral 97-1 indicates the bus slave (slave_1), 97-2 indicates the bus slave (slave_2), and 97-3 indicates the bus slave (slave_3) in the present embodiment. Reference numeral 98 indicates the data signal which is selected from among the data signals of the respective bus slaves by the selector circuit 96. Reference numeral 92-1 indicates the data signal which is sent from the bus master 91-1 to the bus unit 94, 92-2 indicates the data signal which is sent from the bus master 91-2 to the bus unit 94, 92-3 indicates the data signal which is sent from the bus master 91-3 to the bus unit 94. Reference numeral 93-1 indicates the internal clock which is generated by the bus control unit 95 and supplied to the bus slave 97-1, 93-2 indicates the internal clock which is generated by the bus control unit 95 and supplied to the bus slave 97-2, and 93-3 indicates the internal clock which is generated by the bus control unit 95 and supplied to the bus slave 97-3.

As for the present embodiment, it is not necessary to use a specific bus protocol, and the pipelined bus to which the clock sync control method of the present embodiment may include two or more bus masters and two or more bus slaves. The clock sync control method of the present embodiment is applicable to any pipelined bus in which the bus control unit 95 controls the data transfer between the selected bus master and the selected bus slave by performing the arbitration to permit which bus master to perform the data transfer therefrom, and the selection as to which bus slave is selected as the destination unit of the data transfer. The bus control unit 95 controls the selector circuit 96 so that one of the data signals supplied from the bus masters is selected as the data signal which is pertinent to the data transfer and the selected data signal is outputted to the respective bus slaves 97-1 to 97-3.

In the present embodiment, the sync control module which corresponds to each internal module is provided in the bus control unit 95 in the bus unit 94. The reference clock and the clock sync signal are supplied to the sync control module from the clock generating unit (riot shown in FIG. 9). The sync control module of the present embodiment carries out the selective generation of the internal clock in which the internal clock being supplied to each of the internal modules which are connected to the bus is generated selectively. In this respect, the selective generation, carried out by the sync control module of the present embodiment, means that only the internal clock which is supplied to the internal module (the bus master/slave) pertinent to the data transfer between the bus master and the bus slave is generated.

By stopping or slowing down the supply of the internal clocks to the internal modules (the bus master/slave) which are not pertinent to the bus transfer, it is possible for the sync control module of the present embodiment to attain reduction of the power consumption of the whole block of the internal modules connected to the bus.

The circuit structure which is necessary for the clock generating unit to generate the internal clock in the sync control module of the present embodiment is essentially the same as the circuit structure of the clock generating unit in the previously described embodiment, and a description thereof will be omitted. Moreover, concerning the determination of the timing to start the supply of the internal clock or the timing to stop the supply of the internal clock for use in the method of the present embodiment, the same method as described above with reference to FIG. 4 and FIG. 5 may be used, and a description thereof will be omitted.

Figure 10:
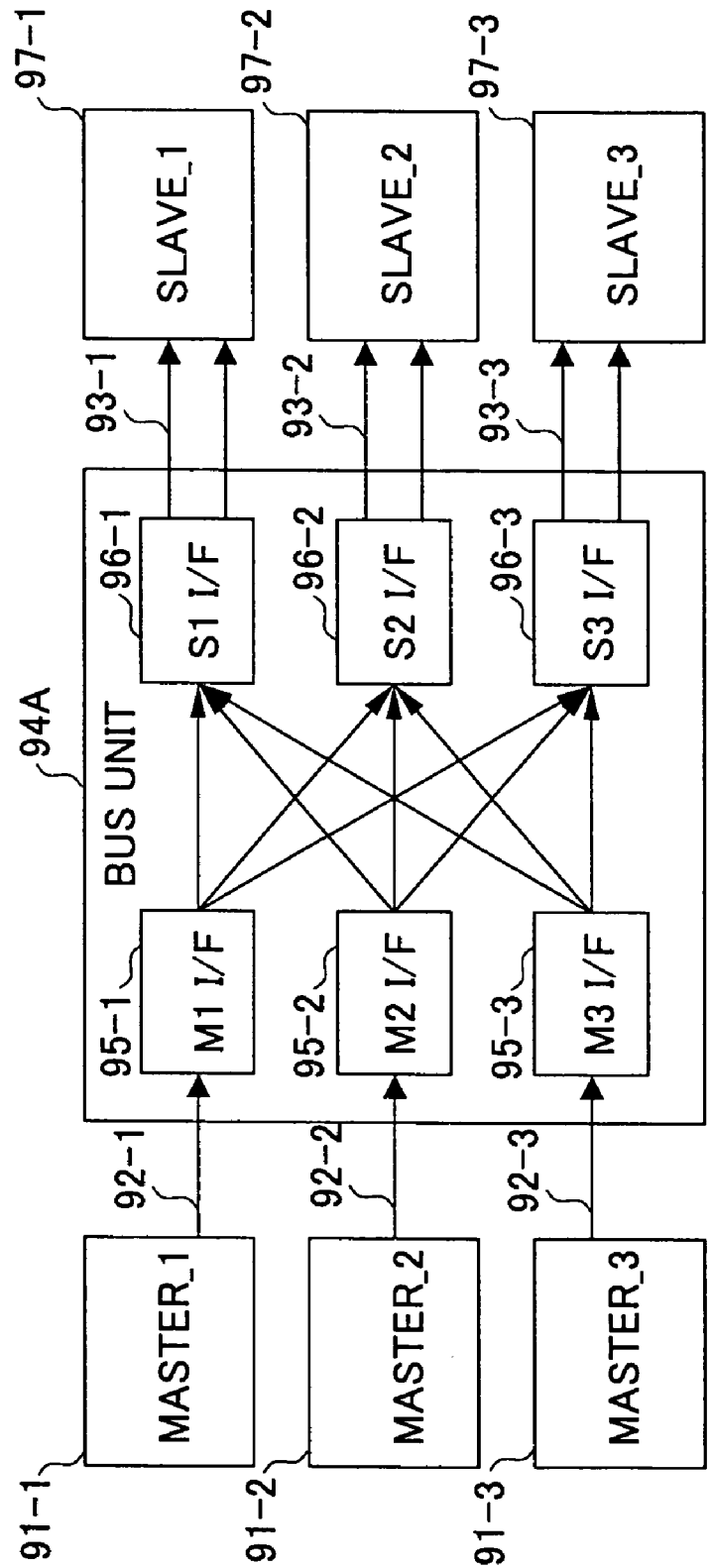
FIG. 10 is a block diagram for explaining another embodiment of the clock sync control method of the invention.

Next, the clock sync control method of the present embodiment is applied to the crossbar bus, which is explained below. FIG. 10 shows another embodiment of the clock sync control method of the invention.

In FIG. 10, reference numeral 91-1 indicates the bus master (master_1), 92-1 indicates the data signal sent from the bus master 91-1, 91-2 indicates the bus master (master_2), 92-2 indicates the data signal sent from the bus master 91-2, 91-3 indicates the bus master (master_3), and 92-3 indicates the data signal sent from the bus master 91-3. Reference numeral 94A indicates the bus unit which has a specific bus protocol, 97-1 indicates the bus slave (slave_1), 97-2 indicates the bus slave (slave_2), and 97-3 indicates the bus slave (slave_3). Reference numeral 95-1 indicates the interface unit (M1 I/F) of the bus unit 94A connected with the bus master 91-1, 95-2 indicates the interface unit (M2 I/F) of the bus unit 94A connected with the bus master 91-2, and 95-3 indicates the interface unit (M3 I/F) of the bus unit 94A connected with the bus master 91-3. Reference numeral 96-1 indicates the interface unit (S1 I/F) of the bus unit 94A connected with the bus slave 97-1, 93-1 indicates the internal clock supplied from the interface unit 96-1 to the bus slave 97-1, 96-2 indicates the interface unit (S2 I/F) of the bus unit 94A connected with the bus slave 97-2, 93-2 indicates the internal clock supplied from the interface unit 96-2 to the bus slave 97-2, 96-3 indicates the interface unit (S3 I/F) of the bus unit 94A connected with the bus slave 97-3, and 93-3 indicates the internal clock supplied from the interface unit 96-3 to the bus slave 97-3.

As for the embodiment of FIG. 10, it is not necessary to use a specific bus protocol, and the clock sync control method of the present embodiment is applied to the crossbar bus. In the crossbar bus, each of the bus masters can access a desired one of the bus slaves via the bus matrix independently. The respective interface units for the bus masters and the respective interface units for the bus slaves are provided in the bus unit 94A.

The arbitration circuit of the bus matrix, which is provided in the interface units 96-1 to 96-3 for the bus slaves or in the bus unit 94A, carries out, when the data transfer requests from two or more bus masters 91-1 to 91-3 to a single bus slave are in congestion, the arbitration to determine which data transfer request (or which bus master) should be processed preferentially. In the bus unit 94A, the interface units, corresponding to the related bus master and bus slave which are relevant to the data transfer, are connected together in accordance with the control signals from the bus control unit (not shown in FIG. 10).

In the embodiment of FIG. 10, the sync control module, which corresponds to each internal module and generates the internal clock to each internal module connected, is provided in each of the master interface units 95-1 to 95-3 and the slave interface units 96-1 to 96-3 with respect to the bus unit 94A which processes the bus transfer. By detecting the presence of the bus transfer request etc., the sync control module, corresponding to the bus master and the bus slave which need the supply of the internal clock, selectively generates the required internal clock and supplies the same. Similar to the previous embodiments, the reference clock and the clock sync signal are supplied to each sync control module from the clock generating unit (which is not shown in FIG. 10).

Figure 11:
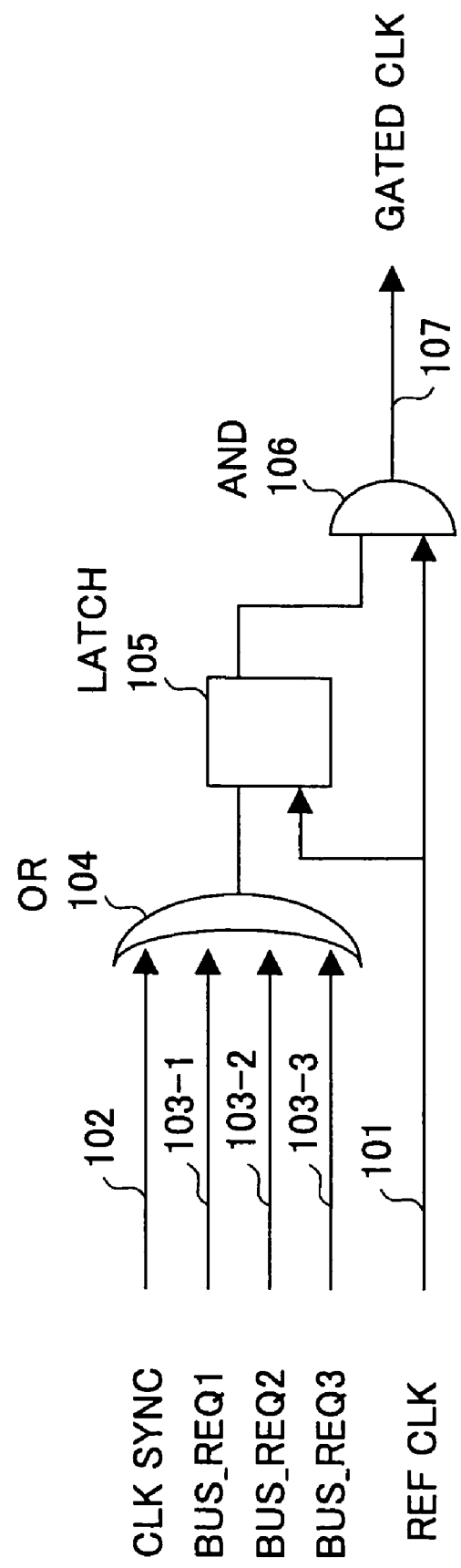
FIG. 11 is a circuit diagram of an embodiment of the sync control module for use in the clock sync control method of FIG. 10.

FIG. 11 shows an embodiment of the sync control module which is provided in each of the slave interface units 96-1 to 96-3 of the bus unit 94A of FIG. 10.

In FIG. 11, reference numeral 101 indicates the reference clock, 102 indicates the clock sync signal, and 104 indicates the OR element for taking the logic OR of the clock sync signal 102 and the request signals 103-1 to 103-3 received from the bus masters 92-1 to 92-3. The OR element 104 generates the internal clock control signal in order to generate the internal clock (the gated clock). Reference numeral 105 indicates the latch cell, 106 indicates the AND element for generating the internal clock (the gated clock), and 107 indicates the gated clock which is generated. Reference numeral 103-1 indicates the request signal which is generated by the interface unit 95-1 of the bus master 91-1, 103-2 indicates the request signal which is generated by the interface unit 95-2 of the bus master 91-2, and 103-3 indicates the request signal which is generated by the interface unit 95-3 of the bus master 91-3.

In the case of the embodiment of FIG. 11, when any one of the request signals 103-1 to 103-3 (which are referred to as req_1 to req_n) from the respective bus masters is set in HIGH level, the output of the OR element 104 is activated.

The internal clock control signal (which is referred to as clk_sync) for generating the internal clock to each internal module in each sync control module is represented by the following formula:

$$clk\_sync = req\_1 + req\_2 + \ldots + req\_n$$

In the above formula, the notation "+" indicates the logic OR.

The gated clock (module_clk) to each internal module is represented by the following formula:

module_clk=(clk_sync*cnt) & reference clock

In the above formula, the notation "cnt" indicates a certain clock control factor. For example, "cnt" indicates the period for which the internal module of concern needs the supply of the internal clock from the sync control module. The notation "&" indicates the logic AND, and the notation "*" means that an arbitrary logic operation is taken when needed.

In the embodiment of FIG. 11, when the bus transfer between one of the bus masters 91-1 to 91-3 and the corresponding one of the bus slaves is required and one of the request signal 103-1 to 103-3 is set in HIGH level, the internal clock control signal is set to HIGH level fixedly. The reference clock 101 is outputted by the AND element 106 without change as the internal clock supplied to each internal module.

On the other hand, when the bus masters 91-1 to 91-3 do not send the request for the bus transfer and all of the request signals 103-1 to 103-3 are set in LOW level, the clock sync signal 102 is outputted by the OR element 104 as the internal clock control signal. Thereby, the supply of the internal clock to each internal module is slowed down with the reference clock 101 according to the clock sync signal 102.

The circuit structure which is necessary for the clock generating unit to generate the internal clock in the sync control module of the present embodiment is essentially the same as the circuit structure of the clock generating unit in the previously described embodiment of FIG. 11, and a description thereof will be omitted. Moreover, concerning the determination of the timing to start the supply of the internal clock or the timing to stop the supply of the internal clock for use in the method of the present embodiment, the same method as described above with reference to FIG. 4 and FIG. 5 may be used, and a description thereof will be omitted.

Next, a description will be given of the method of stopping or slowing down the supply of a bus clock when there is no bus access. The bus clock is used as the reference clock with respect to the bus interface unit.

The clock generating unit in the processor supplies the bus clock, which is used as the specific reference clock, and the clock sync signal corresponding to the bus clock. In the bus unit, the sync control module which generates the internal clock to each internal module and the sync control module which generates the clock to the bus interface unit are provided. The sync control module generates the internal clock, needed by each internal module, from the reference clock and the clock sync signal concerned.

The bus-access request signal is sent to the clock generating unit in the processor. The clock generating unit carrying out the starting, stopping and slowing down of the supply of the bus clock in response to the received bus-access request signal.

The clock generating unit always supplies the low-speed clock sync signal or the clock sync signal which indicates the idle state of the internal module. When the bus access occurs, each sync control module supplies the internal clock to the related internal module during the bus transfer by carrying out the HIGH masking of the clock sync signal which is used to generate the internal clock of each of the bus master and bus slave which are related to the bus access simultaneously.

In addition, the clock sync control method of the present embodiment may be applied to each of the previously described embodiments such that the bus clock is used as the reference clock. Namely, the clock sync control system may be realized by using the two-step composition of the sync control module according to the present embodiment.

In addition, the control unit which outputs a control signal indicating that the supply of the internal clock to the specific internal module is always continued may be provided. The control unit is provided with, for example, the module clock supply control register or the external terminal. By receiving the control signal from the control unit, the sync control module of each of the above-mentioned embodiment may continue to carry out the clock sync control which continues to supply the full-speed internal clock or the internal clock with a fixed operating frequency.

Figure 12:
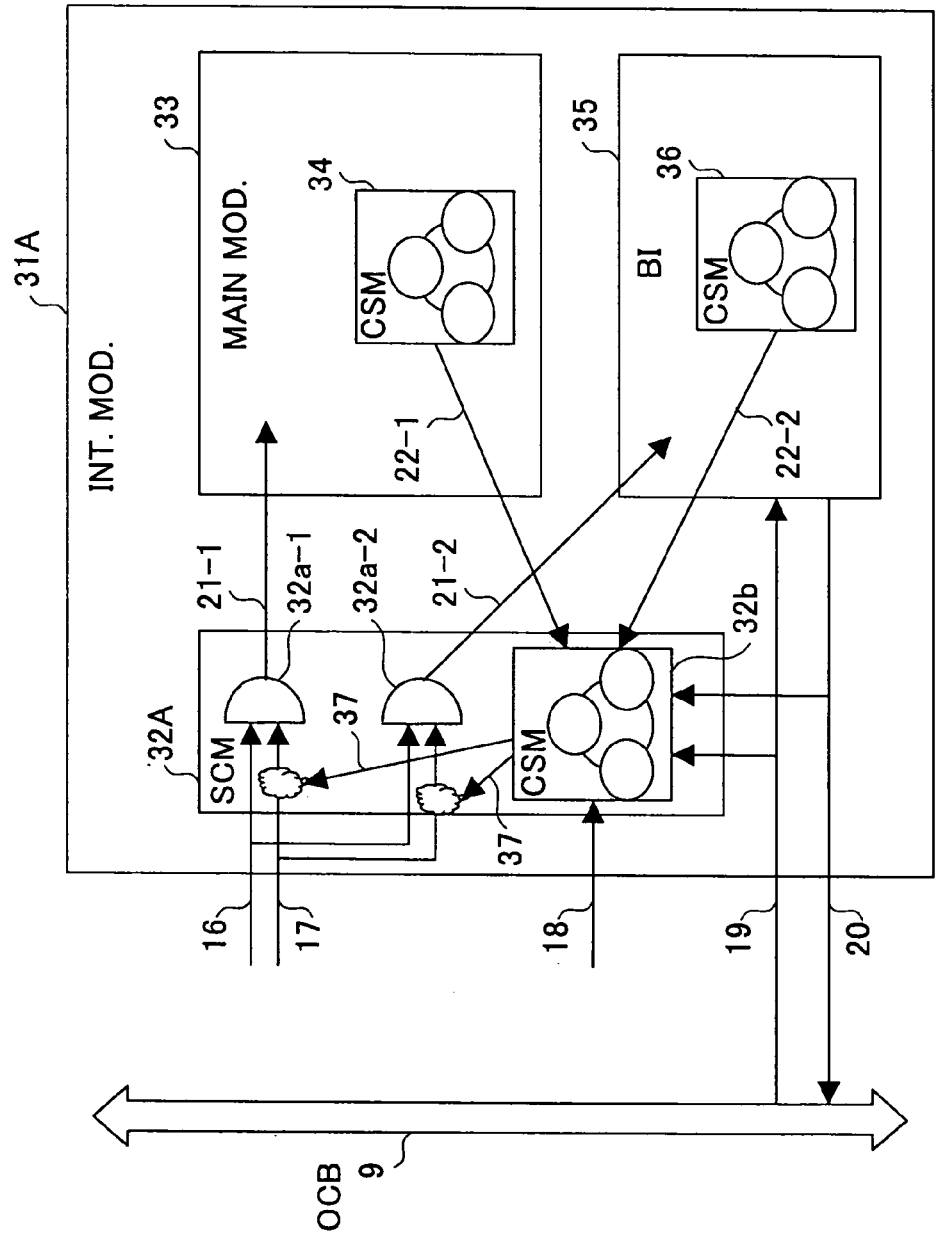
FIG. 12 is a block diagram of another embodiment of the internal module in the semiconductor integrated circuit device of the invention.

FIG. 12 shows another embodiment of the internal module in the semiconductor integrated circuit device of the invention.

In FIG. 12, reference numeral 31A indicates the internal module which has the specific function of the present embodiment and is connected to the on-chip bus (OCB) 9, 32A indicates the sync control module (SCM) which is provided in the internal module 31A and generates the internal clock, and 33 indicates the main module which carries out the specific function of the internal module 31A. Reference numeral 34 indicates the control state machine (CSM) which is provided in the main module 33, 35 indicates the bus interface unit (BI) which is provided in the internal module 31A, and 36 indicates the control state machine (CSM) which is provided in the bus interface unit 35. Reference numeral 16 indicates the reference clock, 17 indicates the clock sync signal, 18 indicates the request signal which is the interrupt request signal or the DMA request to the internal module 31A, 19 indicates the bus request signal which is defined by the bus protocol of the on-chip bus 9, and 20 indicates the bus acknowledge signal which is defined by the bus protocol of the on-chip bus 9. Reference numeral 21-1 indicates the gated clock (the internal clock) for the main module 33 which clock is generated using the reference clock and the clock sync signal by the logic circuit 32a-1 of the sync control module 32A, and 21-2 indicates the gated clock (the internal clock) for the bus interface unit 35 which clock is generated using the reference clock and the clock sync signal by the logic circuit 32a-2 of the sync control module 32A. Reference numeral 22-1 indicates the clock control signal which is sent to the sync control module 32A from the control state machine 34 of the main module 33. The clock control signal 22-1 indicates, for example, that the control state machine 34 is in the IDLE state. Reference numeral 22-2 indicates the clock control signal which is sent to the sync control module 32A from the control state machine 36 of the bus interface unit 35. Reference numeral 37 indicates the internal clock control signal which is outputted by the control state machine 32b and controls the input of the clock sync signal 17 to the logic circuits 32a-1 and 32a-2.

Alternatively, when using the bus request signal 19 and the bus acknowledge signal 20 only is sufficient, the clock control signals 22-1 and 22-2 may be omitted in the embodiment of FIG. 12.

In the semiconductor integrated circuit device of the present embodiment, the internal module 31A is provided so that the sync control module 32A generates both the internal clock 21-2 for the bus interface unit 35 connected to the bus 9, and the internal clock 21-1 for the main module 33 (which is another module of the internal module 31A). Only the supply of the internal clock 21-2 to the bus interface unit 35 is controlled in accordance with a predetermined request signal (e.g., the bus request signal or the interrupt request signal). With respect to the module in the internal module 31A which does not need the operation, the supply of the corresponding internal clock to such module is stopped or slowed down.

According to the semiconductor integrated circuit device and clock sync control method of the above-described embodiment, it is possible to reduce or eliminate the redundant power consumption of the modules connected to the clock tree and the power consumption of the clock tree when there is no need to perform operation. The present embodiment is effective in the reduction of the power consumption for semiconductor integrated circuit devices, such as the system-on-chip (SOC) in which the internal modules carrying two or more function IP macro sets are implemented.

Next, a description will be given of an embodiment of the clock sync control method of the invention.

Generally, in the semiconductor processor having various internal modules, such as the CPU core, the SDRAM controller, the peripheral-bus controller and the timer, the specific internal module always requires a fixed throughput while the CPU requires high-speed operations.

In such semiconductor processor, it is desired that the clock with the smallest possible frequency needed for the processing of application programs is supplied while the demand for attaining the maximum performance according to the operating conditions is satisfied.

In order to satisfy the demand for attaining the maximum performance according to the operating conditions, such as the manufacture variation of the process, the source power voltage, and the temperature, it is desired that the ratio of the clock frequency for the specific internal module to the clock frequency for the CPU core is set to an integral or non-integral multiple, which is selected from among the following cases: (1) internal module=200 MHz, CPU core=300 MHz (1:1.5); (2) internal module=200 MHz, CPU core=400 MHz (1:2.0); (3) internal module=200 MHz, CPU core=500 MHz (1:2.5); (4) internal module=200 MHz, CPU core=600 MHz (1:3.0), and so on.

In order to satisfy the above demand, the clock generating unit in the processor generates two or more internal clocks with the clock ratio of 1:1.5, 1:2.5 or 1:3.5, and supplies such clocks to the internal modules including the CPU core. In such a case, there is the problem that, when the clock edges of each clock are at equal intervals, the signal transfer circuit provided between the modules must operate at the frequency that is twice the frequency of the higher-speed clock.

If such circuit which must operate at the very high frequency is needed, this becomes the significant problem on the logic design, the layout, and the timing verification, etc. in the LSI development.

In order to resolve the problem, the clock sync control method of the present embodiment is provided to allow the internal modules to operate at a desired frequency with no need to carry out the high-speed signal transfer between the modules which operate with different clocks, even when the clock ratio is set to a non-integral multiple.

In the clock sync control method of the present embodiment, the signal transfer between the modules which operate with different clocks with the clock ratio of a non-integral multiple is realized by using a simplified method.

Figure 13:
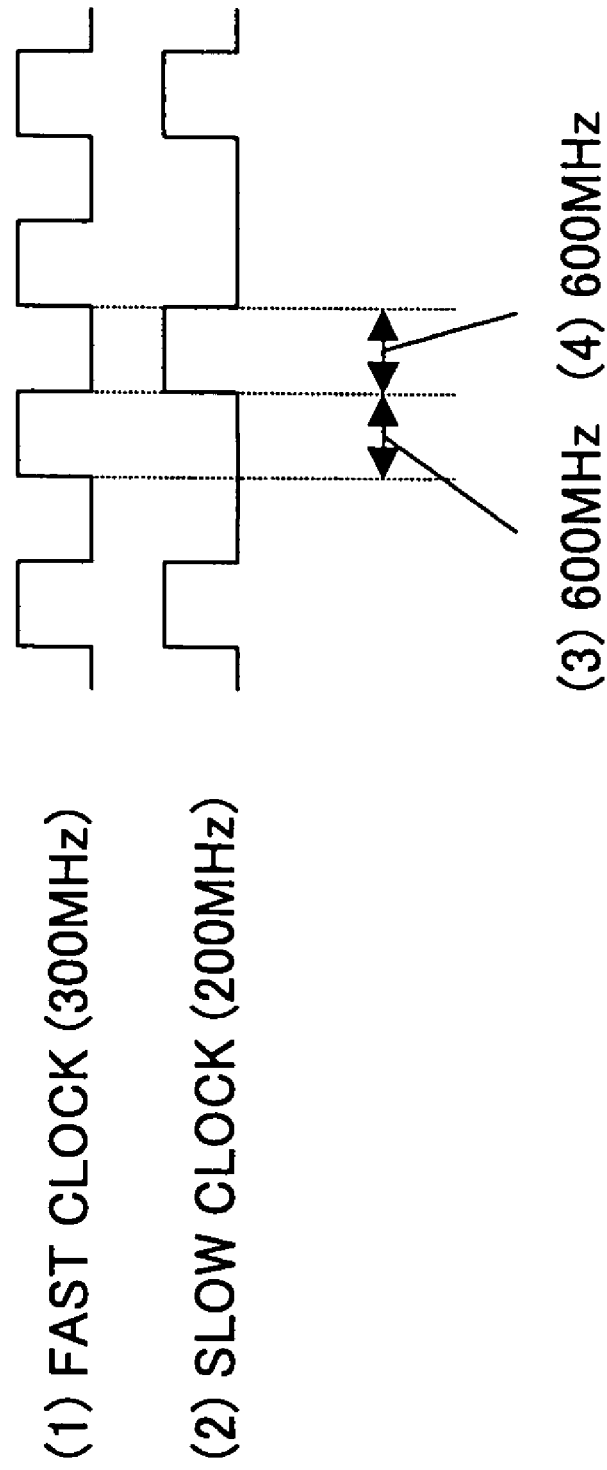
FIG. 13 is a waveform diagram for explaining the problem when the clock ratio of the high-speed clock and the low-speed clock is 1:1.5.

FIG. 13 is a waveform diagram for explaining the problem when the clock ratio of the high-speed clock (the reference clock) and the low-speed clock (the internal clock) is 1:1.5.

In FIG. 13, (1) indicates the high-speed clock (in this case, 300 MHz clock is generated by dividing the PLL output clock frequency 600 MHz by 2), (2) indicates the low-speed clock (in this case, 200 MHz clock is generated by dividing the PLL output clock frequency 600 MHz by 3), (3) indicates the operating frequency at which the signal transfer circuit must operate when the signal transfer from the high-speed clock to the low-speed clock is performed, and (4) indicates the operating frequency at which the signal transfer circuit must operate when the signal transfer from the low-speed clock to the high-speed clock is performed.

As shown in FIG. 13, when synchronizing the data signal between the two modules which operate with the different clocks with the clock ratio of a non-integral multiple, it is necessary that the signal transfer circuit between the modules operate at the very high clock frequency that is equal to a lowest common multiple of the frequencies of the two clocks, so that the clock edges of the two clocks are accorded with each other.

Figure 14:
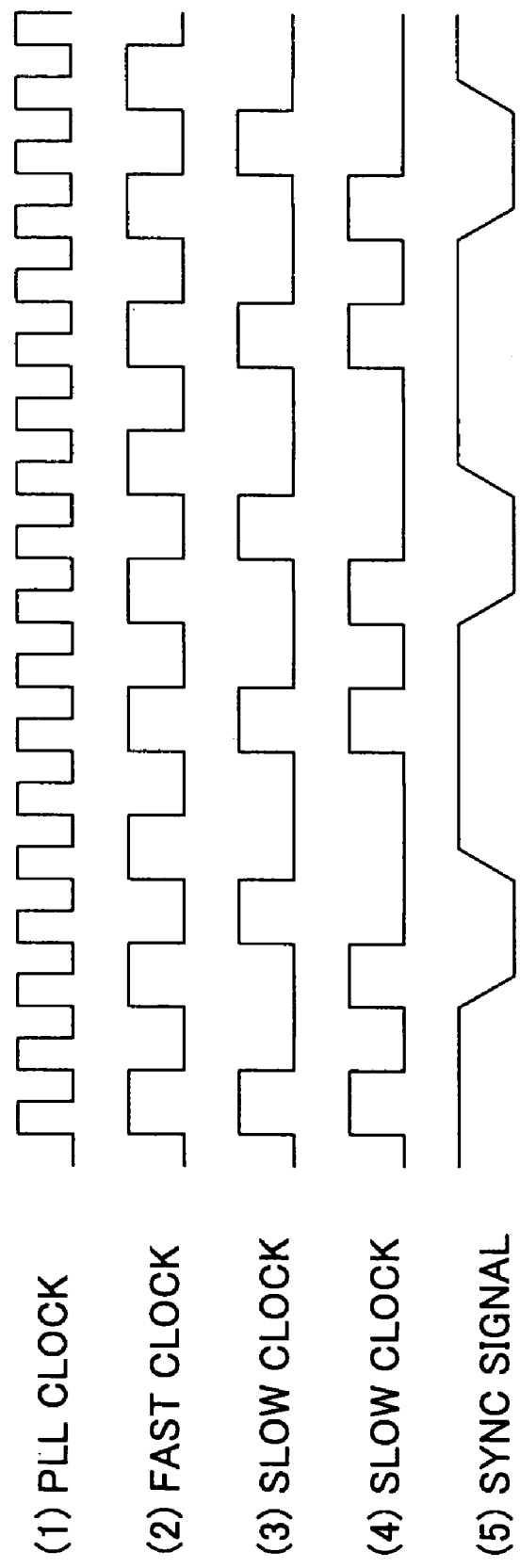
FIG. 14 is a waveform diagram for explaining the clock sync control method of the invention in the case of FIG. 13.
Figure 15:
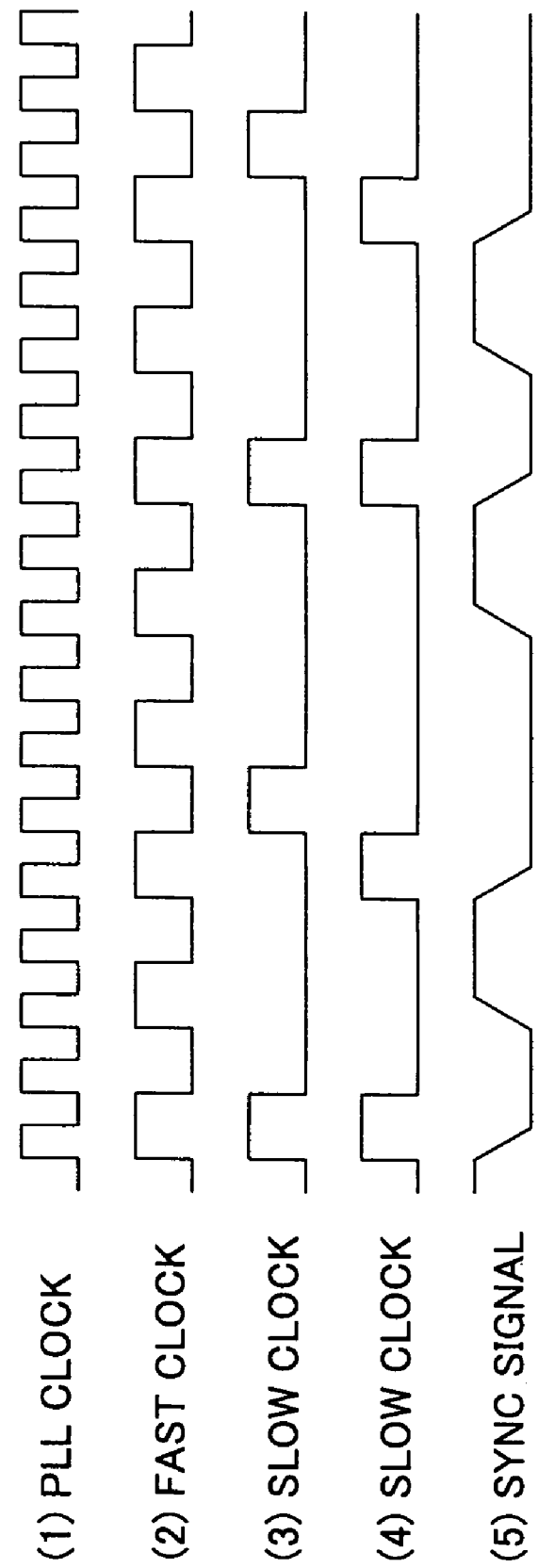
FIG. 15 is a waveform diagram for explaining the clock sync control method of the invention in the case of the clock ratio of 1:2.5.
Figure 16:
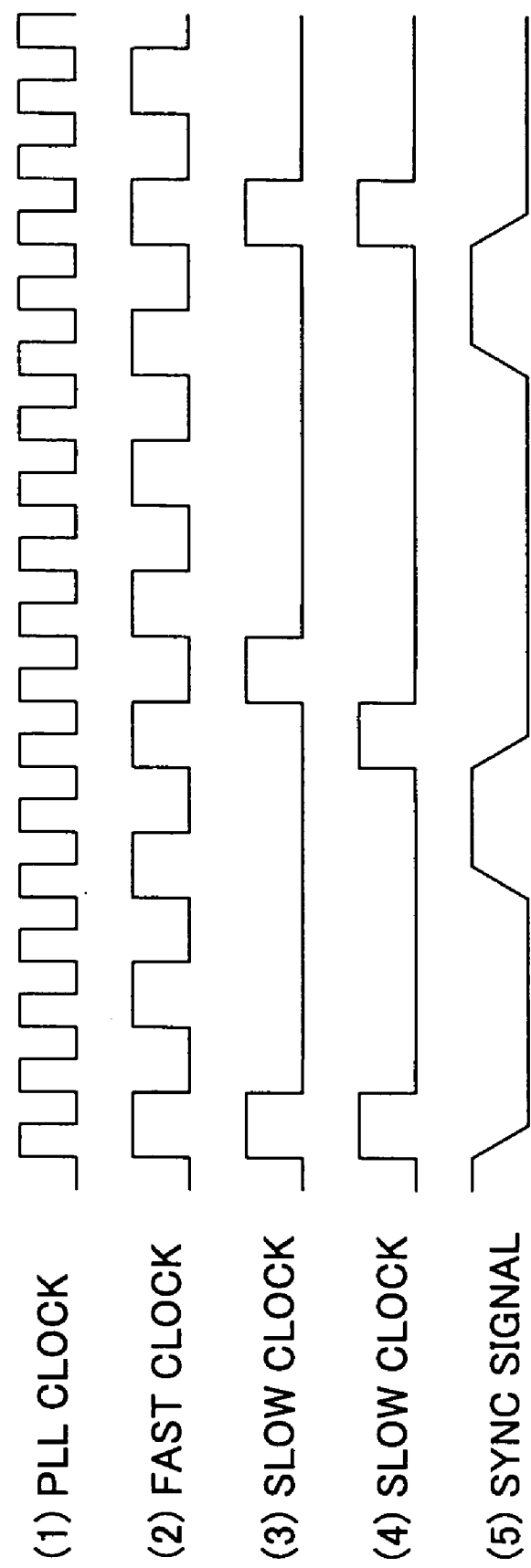
FIG. 16 is a waveform diagram for explaining the clock sync control method of the invention in the case of the clock ratio of 1:3.5.

FIG. 14 is a waveform diagram for explaining the clock sync control method of the invention in the case of FIG. 13 (the clock ratio is 1:1.5). FIG. 15 is a waveform diagram for explaining the clock sync control method of the invention in the case in which the clock ratio is 1:2.5. FIG. 16 is a waveform diagram for explaining the clock sync control method of the invention in the case in which the clock ratio is 1:3.5.

In each of FIG. 14, FIG. 15, and FIG. 16, (1) indicates the PLL clock, (2) indicates the high-speed clock, (3) indicates the low-speed clock with a constant period (the clock edges are at equal intervals) according to the conventional method, (4) indicates the low-speed clock according to the present embodiment, and (5) indicates the clock sync signal according to the present embodiment, respectively.

In the case of FIG. 14, the high-speed clock (2) and the low-speed clock (3) are generated from the PLL clock (1), respectively, and the clock edges of each clock are at equal intervals. In this case, as shown in FIG. 13, it is necessary that the signal transfer circuit provided between the modules which operate with the two clocks, operate at the very high operating frequency that is twice the frequency of the high-speed clock.

To overcome the problem, the clock sync control method of the present embodiment is provided to arrange the edges of the low-speed clock so as to accord with a preceding edge of the high-speed clock as in the low-speed clock of the present embodiment indicated by (4) in FIG. 14. Hence, the signal transfer between the modules which operate with the two clocks can be realized easily without using the very high clock frequency that is twice the frequency of the high-speed clock. Namely, only if the signal transfer circuit can operate at the frequency of the high-speed clock, the clock sync control method of the present embodiment makes it possible to attain the signal transfer between the modules which operate with the clocks, without causing the problem.

Since the clock edges of the low-speed clock are not at equal intervals according to the present embodiment, the clock sync signal (5) is generated in order to indicate the position of the clock edges of the low-speed clock, and the clock sync signal (5) is used for controlling the transfer of the data signal between the modules.

By supplying the clock sync signal to the module of the high-speed operation, the module of the high-speed operation can recognize the timing to receive the data signal which is generated by the module of the low-speed operation, and the synchronization of the signals which are generated with the different clocks is attained.

In the present embodiment, the clock sync signal (5) is generated in accordance with the clock edges of the high-speed clock.

FIG. 15 shows the case in which the clock ratio of the high-speed clock and the low-speed clock is 1:2.5. FIG. 16 shows the case in which the clock ratio of the high-speed clock and the low-speed clock is 1:3.5.

Similar to the case of FIG. 14, in the cases of FIG. 15 and FIG. 16, the edges of the low-speed clock are arranged so as to accord with a preceding edge of the high-speed clock and the clock sync signal indicating the position of the clock edge of the low-speed clock is used for controlling the transfer of the data signal, so that the synchronization of the signals generated with the two clocks with the clock ratio of a non-integral multiple is attained.

Figure 17:
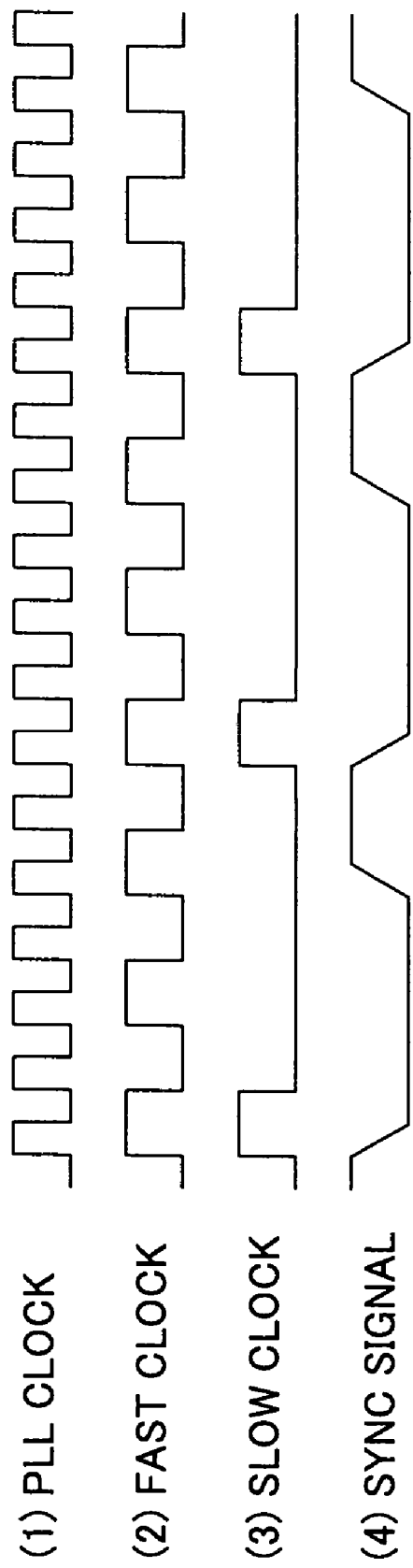
FIG. 17 is a waveform diagram for explaining the clock sync control method in the case of the clock ratio of 1:3.

FIG. 17 is a waveform diagram for explaining the clock sync control method in the case in which the clock ratio is 1:3.

In FIG. 17, (1) indicates the PLL clock, (2) indicates the high-speed clock, (3) indicates the low-speed clock with a constant period according to the conventional method, and (4) indicates the clock sync signal, respectively.

As shown in FIG. 17, the clock ratio of the high-speed clock and the low-speed clock is 1:3 which corresponds to an integral multiple. When the clock ratio is the integral multiple, the positions of the clock edges of the low-speed clock are also at equal intervals. The clock sync signal (5) is generated in order to indicate the position of the clock edges of the low-speed clock.

Figure 18:
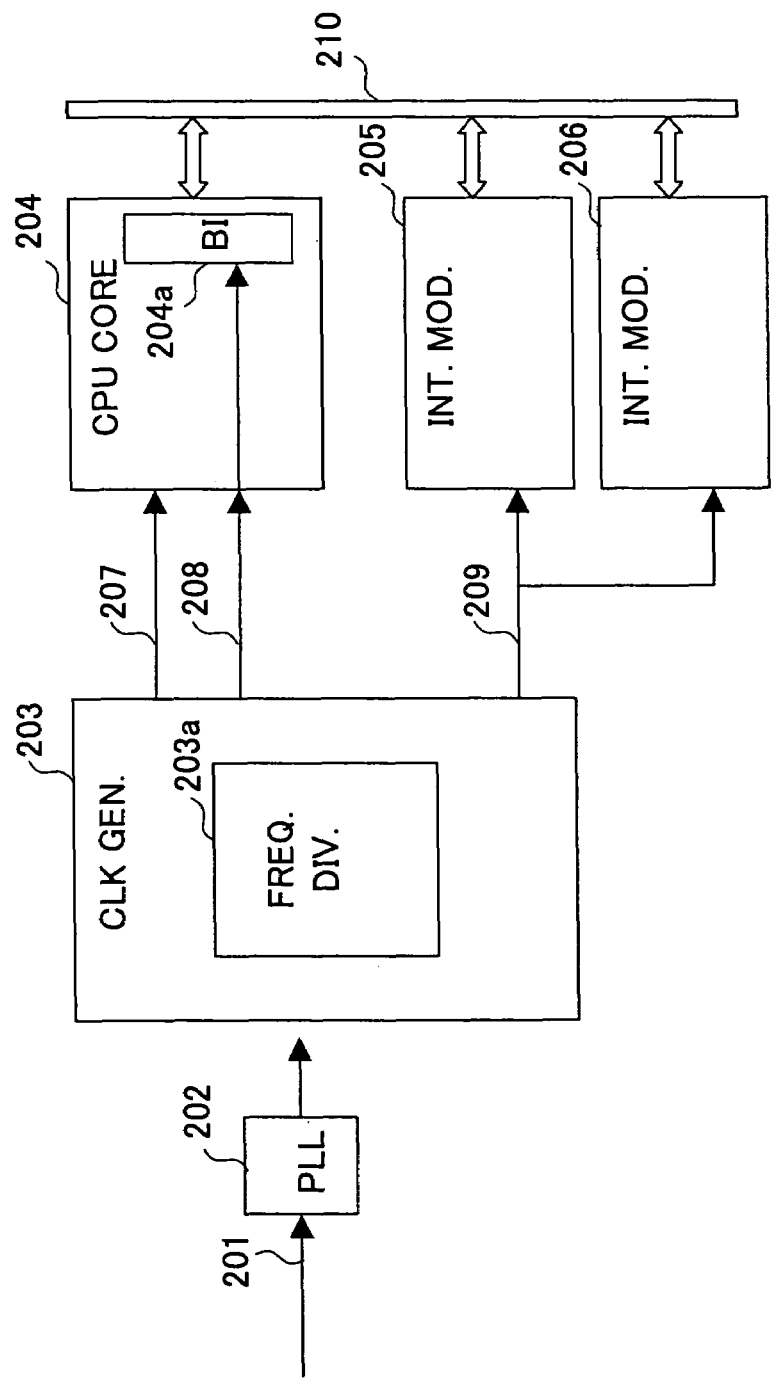
FIG. 18 is a block diagram of an embodiment of the clock generating unit in the semiconductor integrated circuit device of the invention.

FIG. 18 shows an embodiment of the clock generating unit of the invention.

In FIG. 18, reference numeral 201 indicates the external input clock, 202 indicates the PLL circuit, 203 indicates the clock generating unit provided in the processor, 204 indicates the CPU core, 205 indicates the internal module, 206 indicates the internal module, 207 indicates the high-speed clock, 208 indicates the clock sync signal, 209 indicates the low-speed clock, and 210 indicates the on-chip bus provided in the processor, respectively.

The embodiment of FIG. 18 is applied to the processor which utilizes the high-speed clock, the low-speed clock and the clock sync signal.

In the processor of FIG. 18, the frequency of the external input clock 201 is multiplied by the PLL circuit 202, and the PLL circuit 202 generates the highest-speed clock (which is called the PLL clock) which is used as the base for generating various internal clocks.

The clock generating unit 203 includes the frequency divider 203a which divides the frequency of the PLL clock to create the divided clock frequency. The clock generating unit 203 generates the reference clocks with the divided frequency (in this case, the high-speed clock 207 and the low-speed clock 209) which are supplied to each internal module, by using the output of the frequency divider 203a.

Moreover, the clock generating unit 203 generates the clock sync signal 208, which indicates the position of the edges of the low-speed clock, simultaneously, and supplies the high-speed clock 207 and the clock sync signal 208 to the CPU core 204. The clock generating unit 203 supplies the low-speed clock 209 to the internal modules 205 and 206.

The CPU core 204 basically operates with the high-speed clock (the reference clock). The CPU core 204 includes the bus interface unit (BI) 204a which is connected with the on-chip bus 210 with which the internal modules 205 and 206 of the low-speed operation are connected. The bus interface unit 204a carries out the synchronization of the data signals transmitted on the bus 210, by using the clock sync signal 208 received from the clock generating unit 203.

Namely, the bus interface unit 204a of the CPU core 204 recognizes the position of the clock edges of the low-speed clock by using the clock sync signal 208. Hence, the bus interface unit 204a controls the timing to output the data signal to the on-chip bus 210 so that the transmission of the data signal to the internal module via the bus 210 is carried out appropriately, and controls the timing to receive the data signal from the internal module via the bus 210 so that the receiving of the data signal from the internal module is carried out appropriately.

According to the clock generating unit of the present embodiment, it is possible to easily construct the circuit structure of the processor without causing the signal transfer at the high-speed clock frequency in the case in which the clock ratio is a non-integral multiple of 1:1.5, by using the low-speed clock 209 and the clock sync signal 208.

Figure 19:
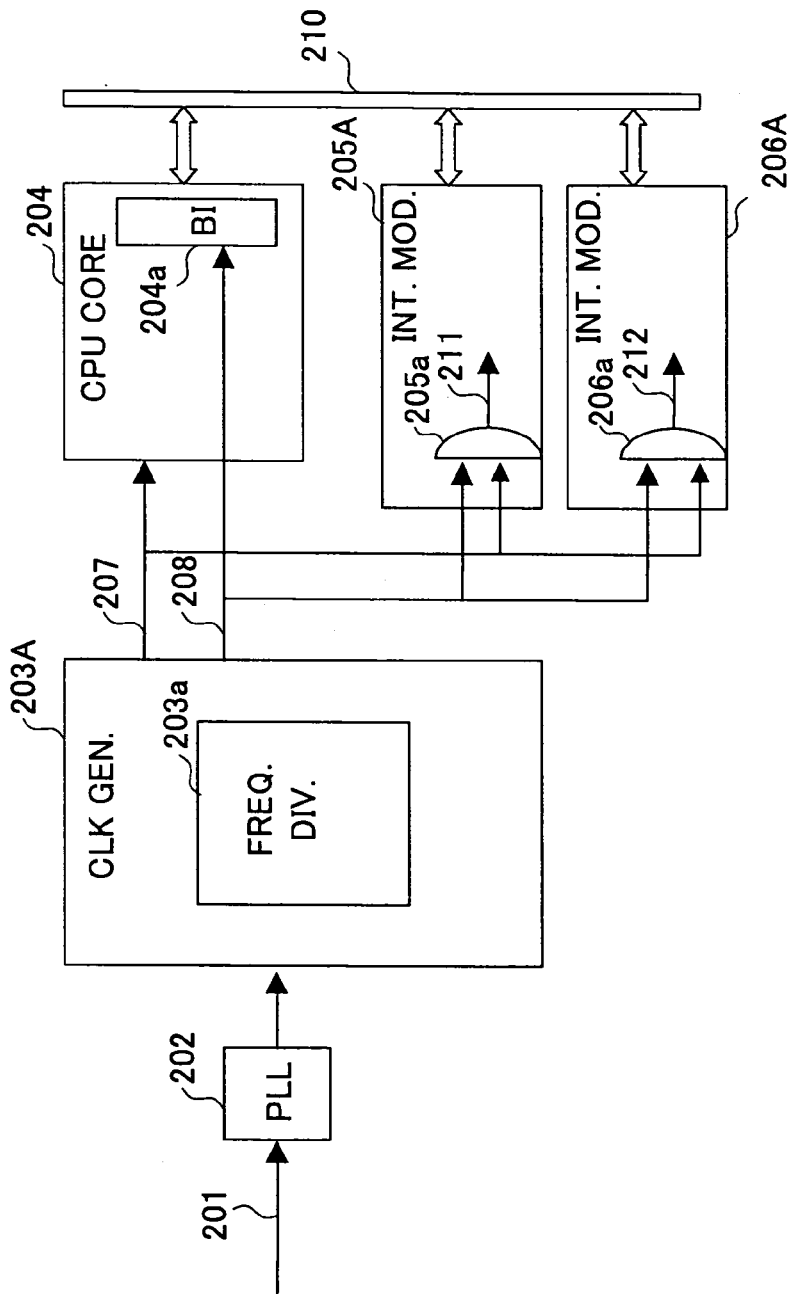
FIG. 19 is a block diagram of another embodiment of the clock generating unit in the semiconductor integrated circuit device of the invention.

FIG. 19 shows another embodiment of the clock generating unit of the invention.

In FIG. 19, reference numeral 201 indicates the external input clock, 202 indicates the PLL circuit, 203A indicates the clock generating unit provided in the processor, 204 indicates the CPU core, 205A indicates the internal module, 206A indicates the internal module, 207 indicates the high-speed clock (the reference clock), 208 indicates the clock sync signal, 210 indicates the on-chip bus provided in the processor, 211 indicates the low-speed clock which is generated by the gated-clock generating unit 205a of the internal module 205A, and 212 indicates the low-speed clock which is generated by the gated-clock generating unit 206a of the internal module 206A, respectively.

In the embodiment of FIG. 19, the low-speed clocks used by the internal module 205A and the internal module 206A are generated by the gated-clock buffer in each of the internal modules based on the high-speed clock 207 and the clock sync signal 208.

The circuit structure of the clock generating unit for generating the low-speed clock for each of the internal modules may be constructed using the composition of the sync control module described above with reference to the previous embodiments, rather than the composition of the gated-clock generating units 205a and 206a shown in FIG. 19.

By using such composition, the clock tree as the whole chip can be constructed with the single high-speed clock, and it is possible to easily reduce the clock skew at the time of the layout design.

Figure 20:
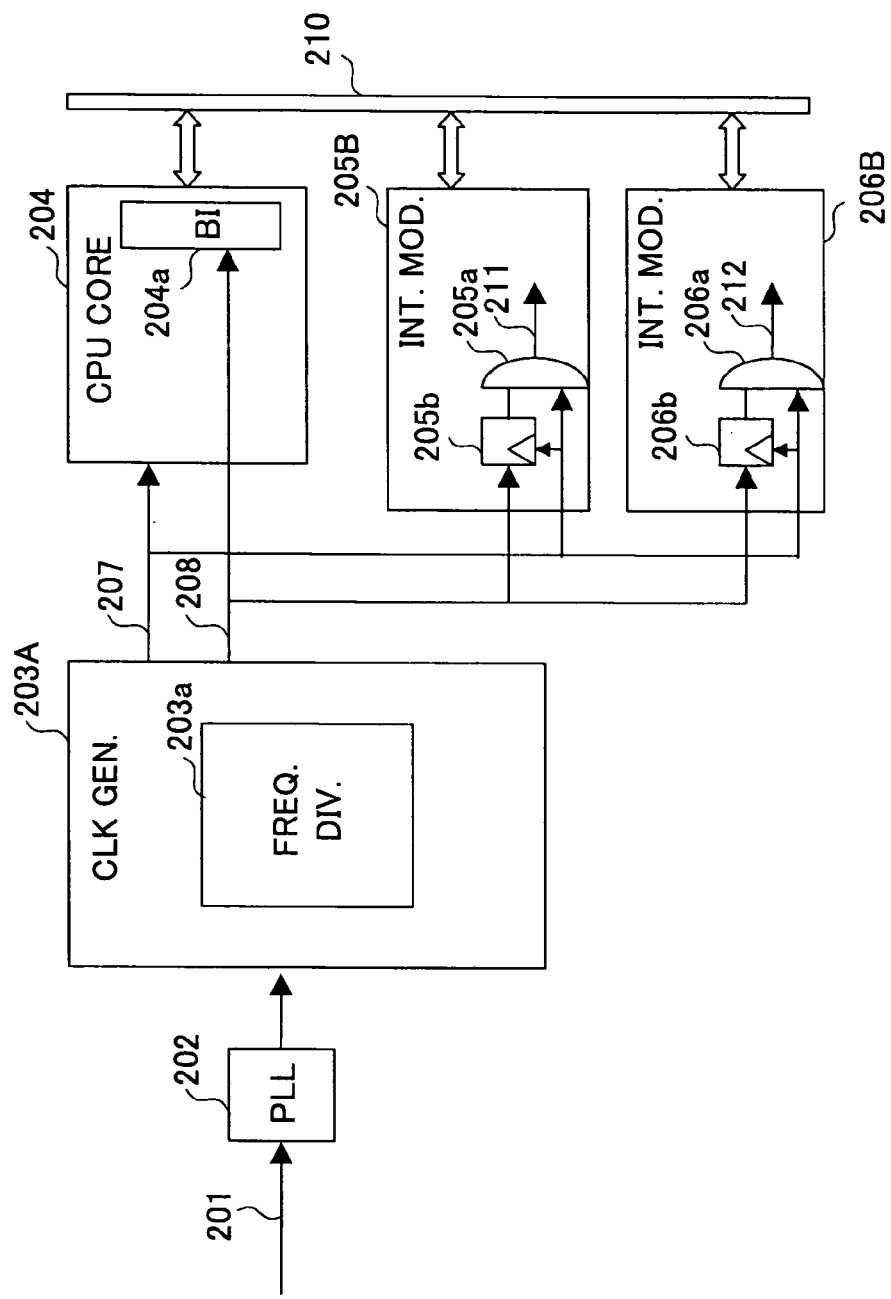
FIG. 20 is a block diagram of another embodiment of the clock generating unit in the semiconductor integrated circuit device of the invention.

FIG. 20 shows another embodiment of the clock generating unit of the invention.

In FIG. 20, reference numeral 201 indicates the external input clock, 202 indicates the PLL circuit, 203A indicates the clock generating unit provided in the processor, 204 indicates the CPU core, 205B indicates the internal module, 206B indicates the internal module, 207 indicates the high-speed clock (the reference clock), 208 indicates the clock sync signal, 210 indicates the on-chip bus provided in the processor, 211 indicates the low-speed clock which is generated by the gated-clock generating units 205a and 205b of the internal module 205B, and 212 indicates the low-speed clock which is generated by the gated-clock generating units 206a and 206b of the internal module 206B, respectively.

In the embodiment of FIG. 20, the clock generating unit 203A is modified from the embodiment of FIG. 19, so that the clock sync signal 208 is supplied to each of the internal modules 205B and 206B by the clock generating unit 203A at a shifted timing which is preceded by one cycle from the timing of supplying the high-speed clock 207. The gated-clock generating units of the internal modules 205B and 206B include the latch circuits 205b and 206b, respectively. Each of the latch circuits 205b and 206b holds the clock sync signal 208 in accordance with the high-speed clock 207.

Figure 21:
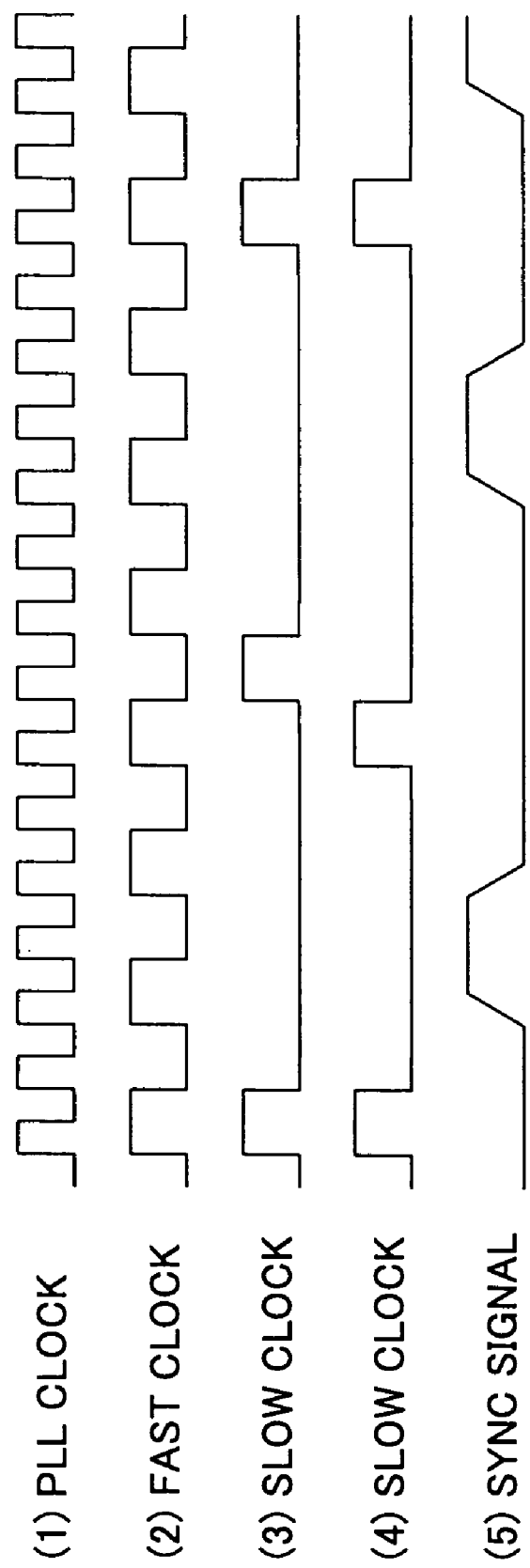
FIG. 21 is a waveform diagram for explaining operation of the clock sync control method in the embodiment of FIG. 20.

FIG. 21 is a waveform diagram for explaining the clock sync control method in the embodiment of FIG. 20.

In FIG. 21, (1) indicates the PLL clock, (2) indicates the high-speed clock, (3) indicates the low-speed clock with a constant period according to the conventional method, (4) indicates the low-speed clock according to the present embodiment, and (5) indicates the clock sync signal according to the present embodiment. The clock sync signal (5) is outputted at the shifted timing which is preceded by one cycle from the timing of outputting the high-speed clock.

As shown in FIG. 21, according to the clock sync control method of the present embodiment, the timing of the rising edges of the clock sync signal (5), which is used to determine the timing to generate the gated clock, is shifted backwardly from the timing of the rising edges of the low-speed clock (4), and the safe design of the clock tree can be attained.

In the clock sync control method of this embodiment, the synchronization of the data signal can be established without carrying out the signal transfer at the very high speed clock between the modules which operate with the different clocks even if the clock ratio is a non-integral multiple. It is possible that the processor operates at a desired operating frequency.

At the time of the design (especially the layout and the timing verification) of the processor LSI with two or more clocks of different frequencies whose clock ratio is a non-integral multiple, if the signal transfer unit between the modules (the bus interface units) can operate at the highest clock frequency among such clock frequencies, it is possible that the processor operate at a desired operating frequency without the problem.

Next, a description will be given of another embodiment of the clock sync control method of the invention.

Figure 22:
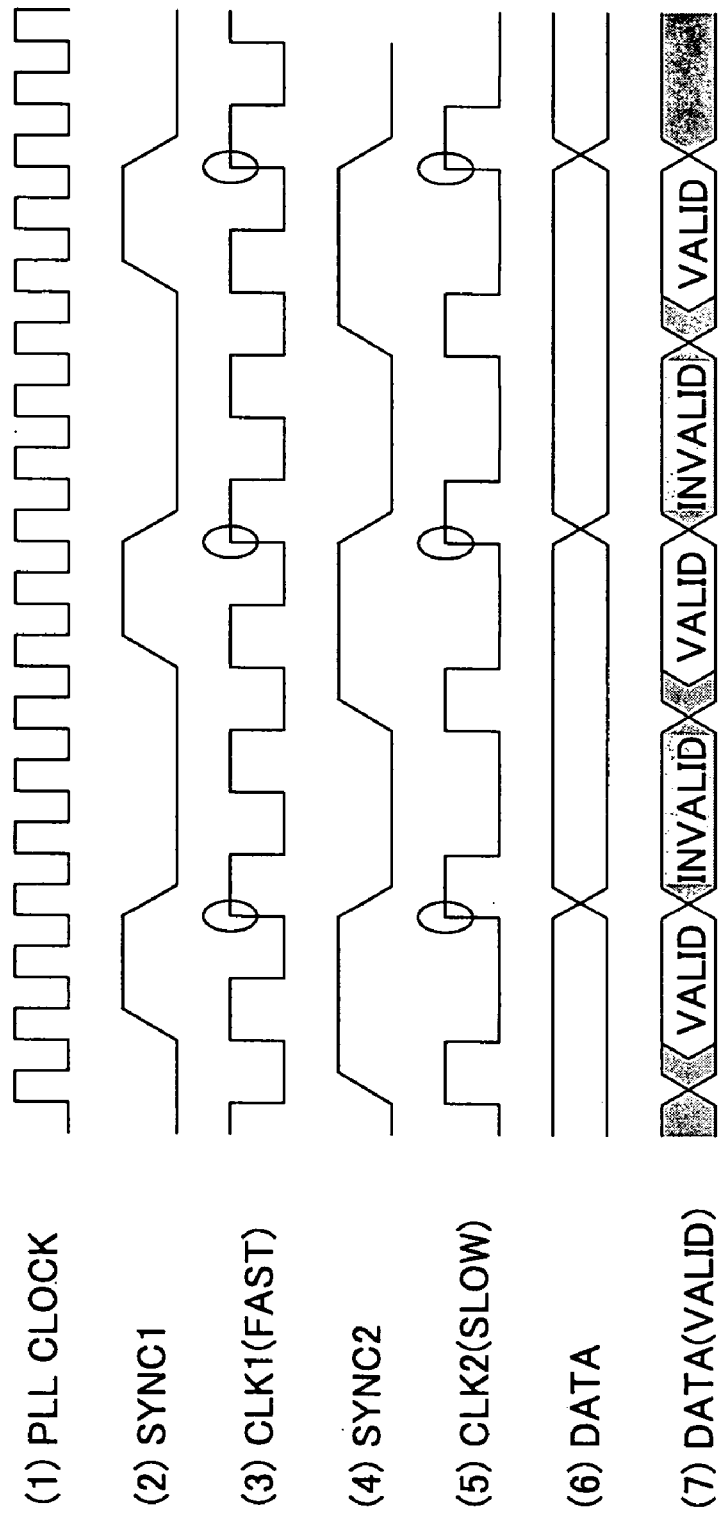
FIG. 22 is a waveform diagram for explaining the clock sync control method of the invention in the case of the clock ratio of 1:1.5.

FIG. 22 is a waveform diagram for explaining an embodiment of the clock sync control method of the invention in the case in which the clock ratio of the high-speed clock and the low-speed clock is 1:1.5 (FIG. 13).

In FIG. 22, (1) indicates the PLL clock, (2) indicates the clock sync signal SYNC1 of the high-speed clock, (3) indicates the high-speed clock CLK1 (the fast reference clock), (4) indicates the clock sync signal SYNC2 of the low-speed clock, (5) indicates the low-speed clock CLK2 (the slow reference clock), (6) indicates the data signal which is generated by the high-speed clock CLK1 and the clock sync signal SYNC1 or generated by the low-speed clock CLK2 and the clock sync signal SYNC2, and (7) indicates the valid data position of the data signal (6) in the data transfer between the modules which operate with the two clocks.

The high-speed clock (3) and the low-speed clock (5) are generated with the frequencies which are produced through the division of the clock frequency of the PLL clock (1), respectively, and the clock edges of the high-speed clock (3) and the low-speed clock (5) are at equal intervals, respectively.

As previously described with reference to FIG. 13, the clock edges of the two clocks do not accord with each other, and the signal transfer circuit between the modules which operate with the two clocks must operate at the very high operating frequency which is twice the frequency of the high-speed clock.

To overcome the problem, in the clock sync control method of the present embodiment, the clock sync signals SYNC1 and SYNC2 shown by (2) and (4) in FIG. 22 are generated, together with the corresponding clock, as a signal which indicates the position where the clock edges of the high-speed clock and the low-speed clock accord with each other.

At the timing which the clock edges of the clocks accord with each other, which is determined based on the clock sync signals SYNC1 and SYNC2, the data transfer between the modules is carried out. Hence, it is possible to realize easily the data transfer (data transmission and receiving) between the modules which operate with the different clocks.

In the present embodiment, the data transfer between the modules is performed only when the clock edges of the clocks are in agreement, and the operating frequency of the data transfer is set to the highest common factor of the frequencies of the two clocks.

That is, the clock sync signals SYNC1 and SYNC2 indicate the position of the valid clock edge of the corresponding clock for the data transfer (transmission and receiving) respectively. The clock sync signals SYNC1 and SYNC2 are generated in conformity with the timing of the clock edges of the high-speed and low-speed clocks, respectively.

Therefore, if the signal transfer circuit (or the bus interface unit) in the present embodiment can operate at the frequency which is equal to the highest common factor of the two clock frequencies, the transfer of the data signal between the modules which operate with the two clocks can be attained successfully.

Figure 23:
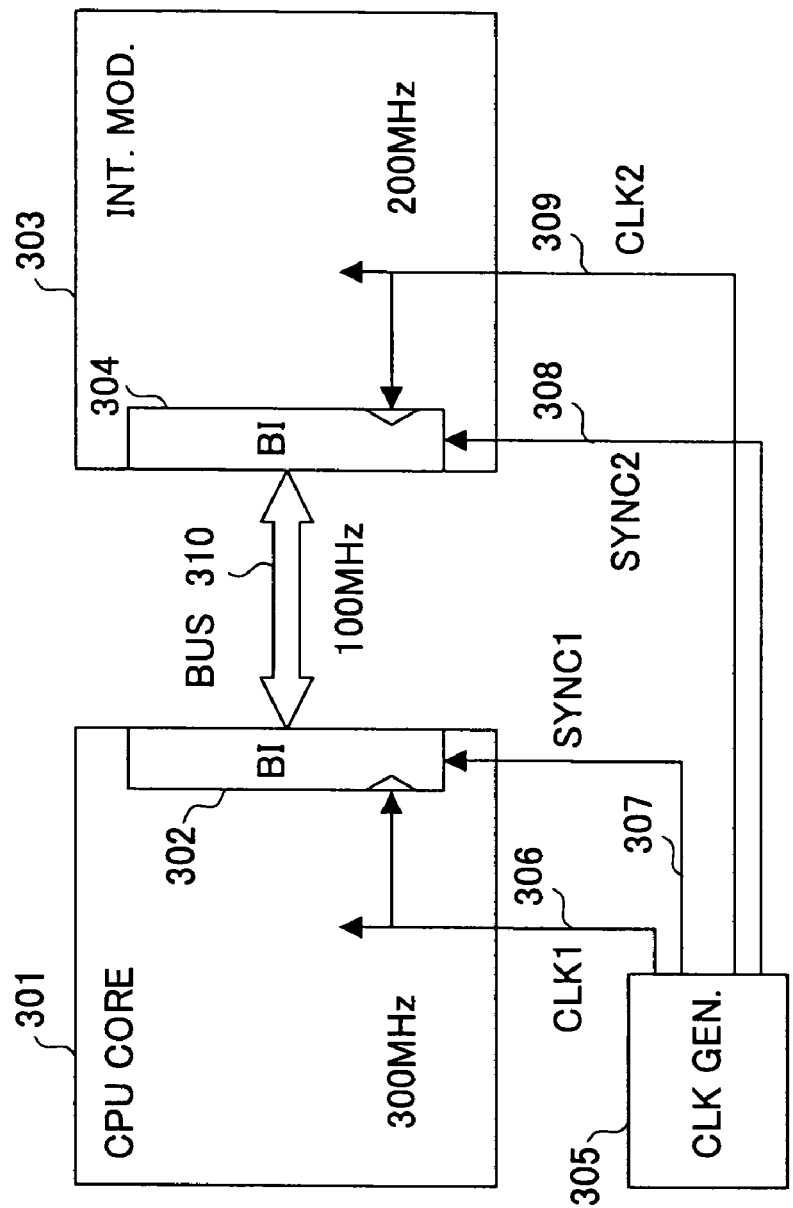
FIG. 23 is a block diagram of an embodiment of the clock sync control system of the invention.

FIG. 23 shows an embodiment of the clock sync control system of the invention.

In FIG. 23, reference numeral 301 indicates the CPU core in this embodiment, 302 indicates the bus interface unit (BI) which is provided in the CPU core 301 in this embodiment, 303 indicates the internal module of the processor in this embodiment, 304 indicates the bus interface unit BI which is provided in the internal module 303 of the processor in this embodiment, 305 indicates the clock generating module provided in the processor in this embodiment, 306 indicates the high-speed clock CLK1 (the fast reference clock, and in this case, 300 MHz), 307 indicates the clock sync signal SYNC1 for the high-speed clock, 309 indicates the low-speed clock CLK2 (the slow reference clock, and in this case, 200 MHz), 308 indicates the clock sync signal SYNC2 for the low-speed clock, and 310 indicates the bus signal on the bus which connects the CPU core 301 and the internal module 303 in this embodiment.

In the clock sync control system of FIG. 23, the CPU core 301 fundamentally operates at the frequency 300 MHz of the clock CLK1, and the internal module 303 fundamentally operates at the frequency 200 MHz of the clock CLK2.

Similar to the embodiment of FIG. 22, the clock sync control system of the present embodiment is configured so that the data transfer between the modules 301 and 303 is performed only when the clock edges of the clocks 306 and 309 are in agreement, and the operating frequency of the data transfer is set to the highest common factor (100 MHz) of the frequencies (300 MHz, 200 MHz) of the two clocks 306 and 309.

Namely, the bus signal 310 on the bus connected between the modules 301 and 303 with the clock ratio of 1:1.5 is operated at the operating frequency of 100 MHz by using the clock sync signals SYNC1 and SYNC2 in the present embodiment. According to the clock sync control system of the present embodiment, it is unnecessary to provide the signal transfer circuit between the modules, which must operate at the very high clock frequency (600 MHz) as shown in FIG. 13.

Figure 24:
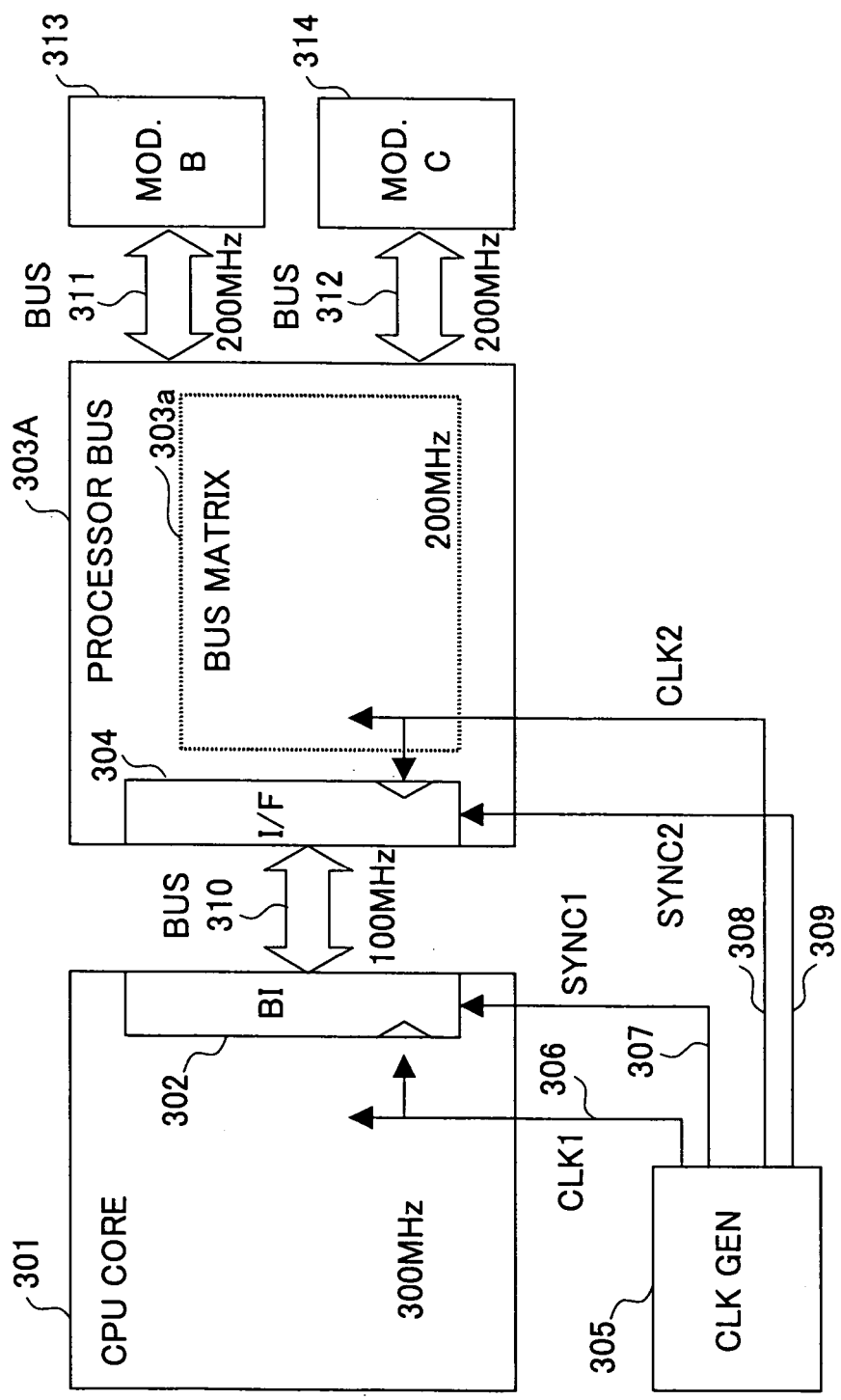
FIG. 24 is a block diagram of another embodiment of the clock sync control system of the invention.

FIG. 24 shows another embodiment of the clock sync control system of the invention.

In the embodiment of FIG. 24, the internal module 303 of FIG. 23 is replaced with the processor bus 303A.

In FIG. 24, reference numerals 301-310 are essentially the same as corresponding reference numerals in the embodiment of FIG. 23, and only the internal module 303 of FIG. 23 is replaced with the processor bus 303A. In the clock sync control system of FIG. 24, reference numeral 311 indicates the bus signal on the bus which connects the processor bus 303A and another internal module (module B), 312 indicates the bus signal on the bus which connects the processor bus 303A and another internal module (module C), 313 indicates the internal module (module B) in this embodiment, and 314 indicates the internal module (module C) in this embodiment.

In the embodiment of FIG. 24, the processor bus 303A is the pipelined bus, and carries out the data transfer in which the data signal is transmitted to the CPU core 301 based on the bus control signal which is synchronized with the bus clock (the low-speed clock CLK2). Moreover, the data transfer between the processor bus 303A and the internal modules 313 and 314 is carried out at the frequency of the low-speed clock CLK2 (200 MHz).

Figure 25:
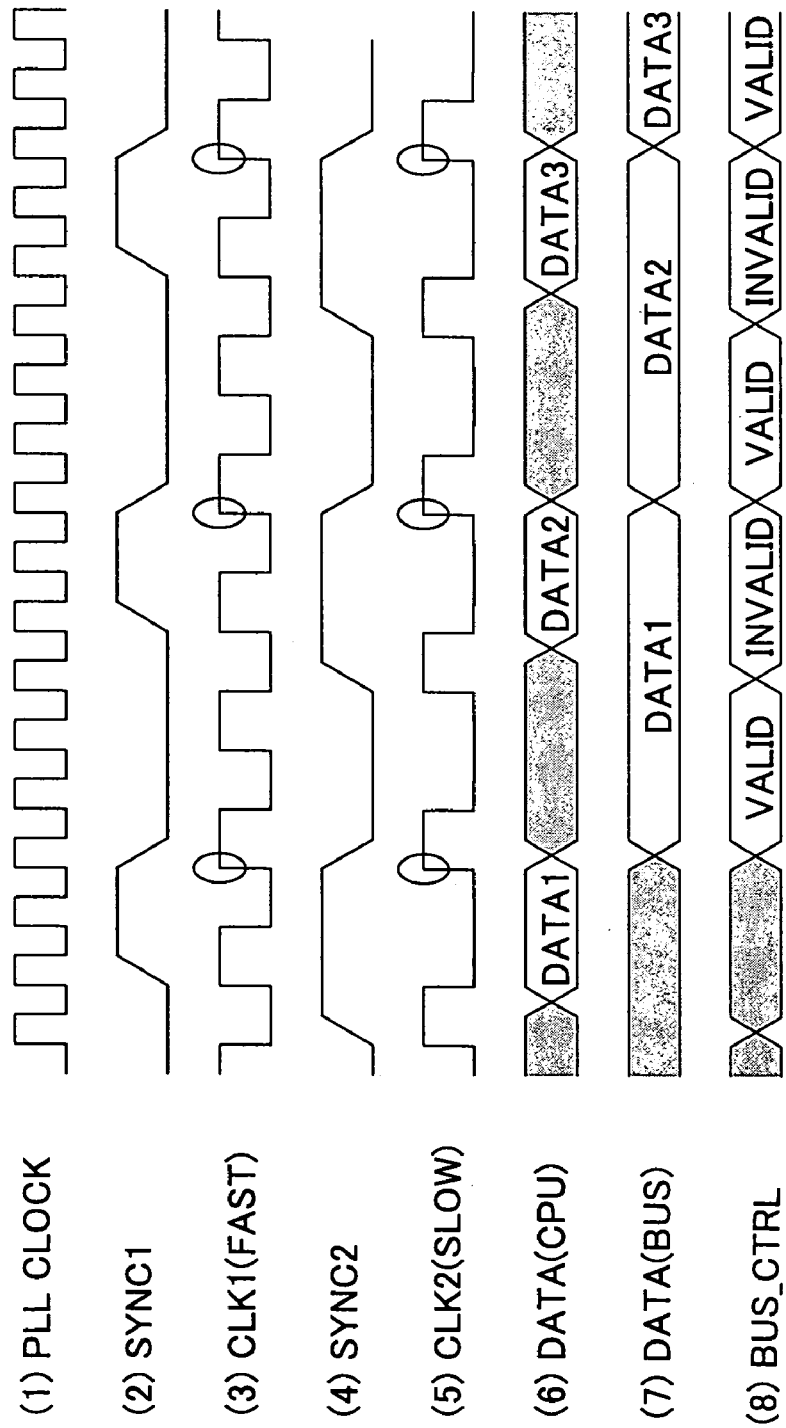
FIG. 25 is a waveform diagram for explaining operation of the clock sync control system of FIG. 24.

FIG. 25 is a waveform diagram for explaining operation of the clock sync control system of FIG. 24.

In FIG. 25, (1) to (5) are essentially the same as corresponding signals in the embodiment of FIG. 22. Moreover, in FIG. 25, (6) indicates the data signal (CPU) in the CPU core 301 when transmitting data from the CPU core 301 to the bus 310, (7) indicates the data signal (BUS) on the bus transaction which is outputted from the CPU core 301 to the bus 310, and (8) indicates the bus control signal (BUS_CTRL) which indicates the valid data position of the data signal on the bus transaction.

In the embodiment of FIG. 25, the data signal (6) generated with the high-speed clock CLK1 in the CPU core 301 is outputted as the bus data signal (7) at the rising edge of the high-speed clock CLK1 when the clock sync signal SYNC1 (2) is set in HIGH level.

In the interface unit 304 of the processor bus 303A which is connected to the CPU core 301 and operates at the frequency of the low-speed clock CLK1, the bus control signal (8) is generated. The bus control signal (8) indicates the valid data position (cycle) of the data signal (7) at which the clock sync signal SYNC2 changes from HIGH level to LOW level.

In the bus control signal (8), the next cycle following the valid cycle is set to the invalid cycle. The interface unit 304 receives the bus data signal which is outputted to the bus 310 by the CPU core 301 during the valid cycle of the bus control signal (8) with which the valid cycle and the invalid cycle are provided alternately. Thus, the bus transfer between the modules 301 and 303A is carried out.

The waveform of the bus control signal (8) shown in FIG. 25 is an example. Alternatively, the embodiment of FIG. 25 may be modified so that the valid cycle of the bus control signal (8) is set to be the same as the HIGH-level cycle of the clock sync signal SYNC2 (the specifications differ for each bus protocol).

In the present embodiment, by providing the valid period and the invalid period in the bus control signal (8), the data can be transmitted or received only when the clock edges of the two clocks are in agreement, in order to attain the signal synchronization between the modules which operate with the clocks of different frequencies whose clock ratio is a non-integral multiple. Therefore, the data signal transfer between the modules with the clock ratio of a non-integral multiple can be easily performed according to the present embodiment.

However, the frequency of the data signal transfer is apparently reduced to the highest common factor (in the present embodiment, 100 MHz) of the two clocks, and the throughput of data processing is reduced, but it is possible that the two modules operate at the desired operating frequency. The clock sync control system of the present embodiment is useful when performing application programs with which only the cache memory of the CPU core is accessed, or when performing application programs with which memory access hardly occurs.

Figure 26:
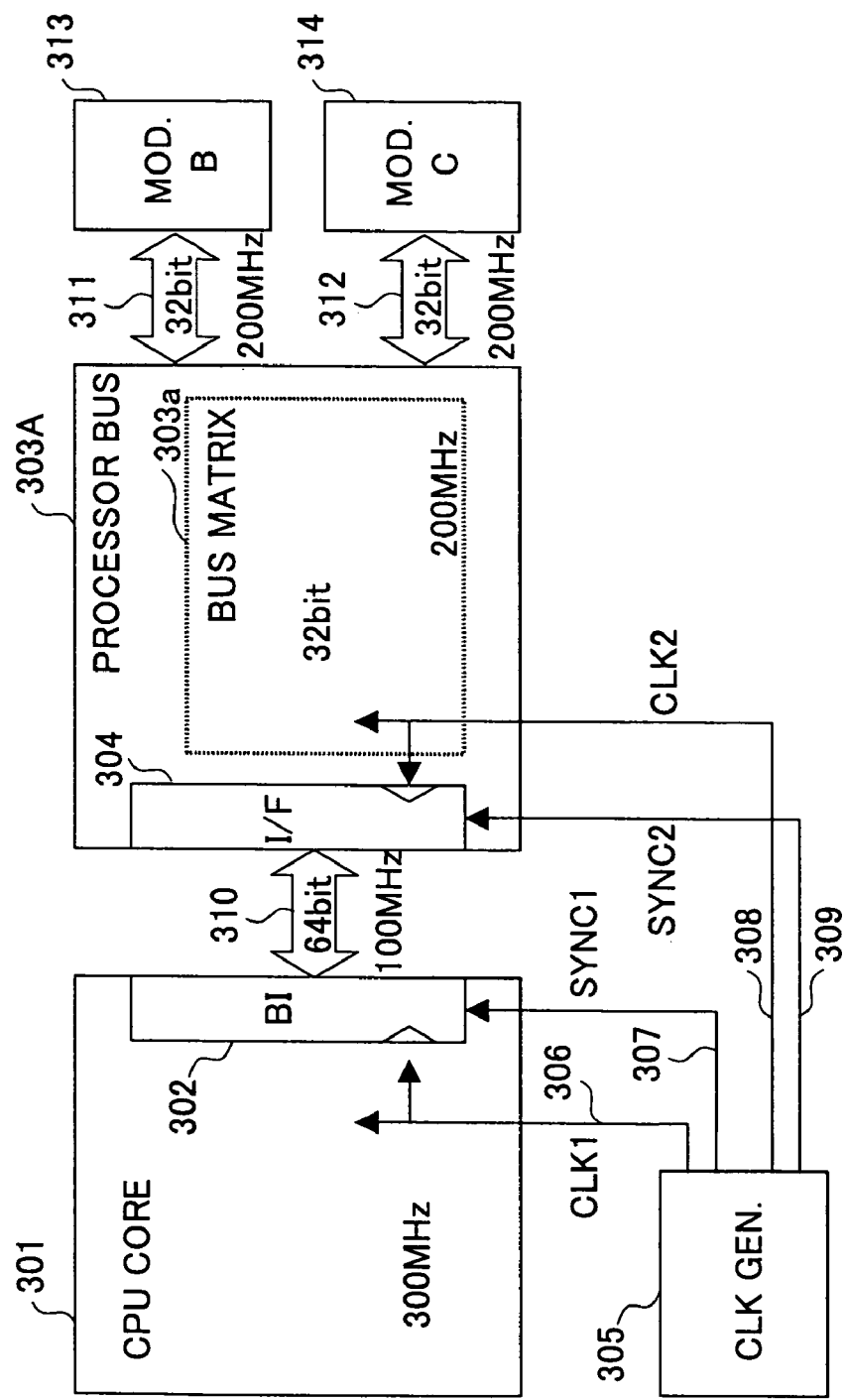
FIG. 26 is a block diagram of another embodiment of the clock sync control system of the invention.

FIG. 26 shows another embodiment of the clock sync control system of the invention.

In FIG. 26, reference numbers 301-314 are essentially the same as corresponding reference numeral in the embodiment of FIG. 24, and a description thereof will be omitted.

In the clock sync control system of FIG. 26, the data bus width of the data bus signal 310 is 64 bits, each data bus width of the bus matrix 303*a* of the processor bus 303A and the bus signals 311 and 312 is 32 bits, and the data bus width of the data bus signal 310 differs from the data bus width of the bus matrix 303*a*.

In the embodiment of FIG. 26, the clock sync control system is configured so that the data bus width of the bus 310 between the CPU core 301 and the processor bus 303A is set to 64 bits. This is twice the data bus width of the bus 311 or 312 between the processor bus 303A and the internal module 313 or 314, and it is possible to prevent reduction of the through rate of data transfer which may take place at the time of the data signal transfer between the modules with the clock ratio of a non-integral multiple.

Figure 27:
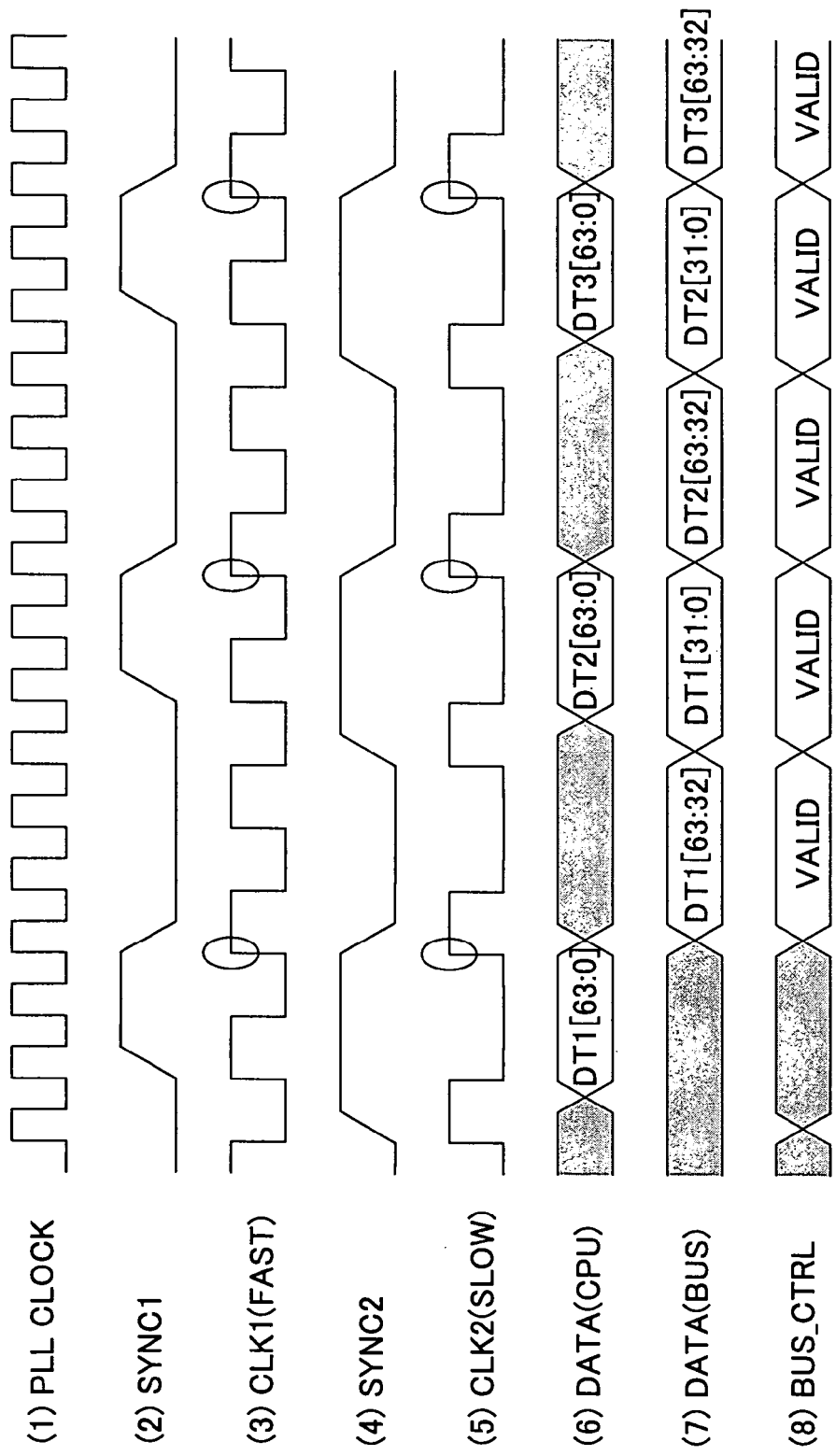
FIG. 27 is a waveform diagram for explaining operation of the clock sync control system of FIG. 26.

FIG. 27 is a waveform diagram for explaining operation of the clock sync control system in the embodiment of FIG. 26.

In FIG. 27, (1) to (8) are essentially the same as corresponding signals in the embodiment of FIG. 25, and a description thereof will be omitted. However, unlike the data signal (6) of FIG. 25, (6) indicates the data signal in the CPU core 301 the data bus width of which is set to 64 bits, and (7) indicates the data signal on the bus transaction the data bus width of which is set to 32 bits, unlike the data signal (7) of FIG. 25. In the embodiment of FIG. 27, the bus signal (7) is comprised of the higher-order 32-bit data portion and the lower-order 32-bit data portion of the data signal (6).

In the embodiment of FIG. 26, the 64-bit data is outputted to the bus 310 from the CPU core 301, and the interface unit 304 of the processor bus 303A connected with the CPU core 301, is configured so that the 64-bit data is divided into the two 32-bit data portions and they are outputted alternately.

As shown in FIG. 27, the bus control signal (8) is provided so that the invalid cycles of the bus control signal (8) in FIG. 25 are changed to the valid cycles. In accordance with the bus control signal (8) of this embodiment, the cycle of the data signal (7) with which the clock sync signal SYNC2 changes from HIGH level to LOW is set to the valid cycle, and the following cycle of the data signal (7) is also set to the valid cycle. According to the present embodiment, it is possible that the processor 303A outputs to the internal module of concern all the divided 32-bit data portions as the valid data.

Figure 28:
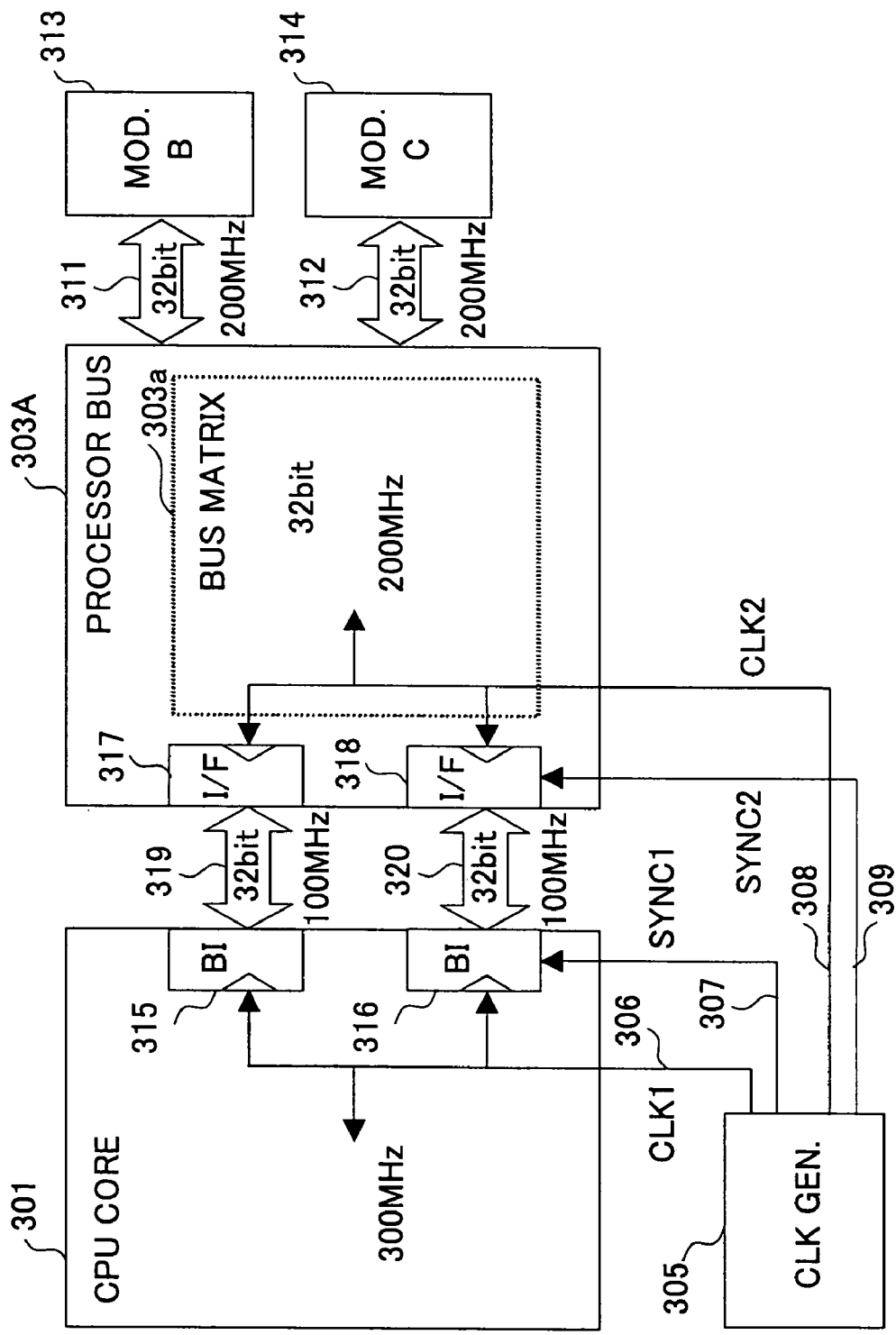
FIG. 28 is a block diagram of another embodiment of the clock sync control system of the invention.

FIG. 28 shows another embodiment of the clock sync control system of the invention.

In FIG. 28, reference numbers 301, 303A, 305-309, and 311-314 are essentially the same as corresponding reference numerals in the embodiment of FIG. 26, and a description thereof will be omitted. In the clock sync control system of FIG. 28, reference numeral 315 indicates the bus interface port (BI) in the CPU core 301 in this embodiment, 316 indicates the bus interface port (BI) in the CPU core 301 in this embodiment, 317 indicates the bus transfer interface circuit (I/F) in the processor bus 303A which is connected with the bus interface port 315, 318 indicates the bus transfer interface circuit (I/F) in the processor bus 303A which is connected with the bus interface port 316, 319 indicates the bus which connects the bus interface port 315 and the bus transfer interface circuit 317, and 320 indicates the bus which connects the bus interface port 316 and the bus transfer interface circuit 318.

The clock sync control system of FIG. 28 is configured to have the circuit structure that is essentially the same as in the embodiment of FIG. 26. This clock sync control system is provided to prevent reduction of the through rate of data transfer which may take place at the time of the data signal transfer between the modules with the clock ratio of a non-integral multiple.

Specifically, the bus interface port 302 of FIG. 26 having the 64-bit data bus width is divided into the two bus interface ports each having the 32-bit data bus width, and the two bus interface ports 315 and 316 are provided in the CPU core 301 in the present embodiment. With the provision of the two bus interface ports in the CPU core 301, the processor bus 303A is also provided with the two bus transfer interface circuits 317 and 318 each having the 32-bit data bus width.

The waveform diagram for explaining operation of the present embodiment is essentially the same as the waveform diagram of FIG. 25 except that the bus transfer transaction is performed with the two bus transfer interface circuits 317 and 318 independently for each port.

As described in the foregoing, according to the clock sync control method and system of the present invention, it is possible that the processor operate at the desired operating frequency without carrying out the very high-speed data transfer between the modules which operate with two or more clocks of different frequencies whose clock ratio is a non-integral multiple. Specifically, at the time of the design (especially the layout and the timing verification) of the processor LSI with two or more clocks of different frequencies whose clock ratio is a non-integral multiple, if the signal transfer circuit or the bus interface unit can operate at the frequency which is equal to the highest common factor of the clock frequencies, the transfer of the data signal between the modules can be attained successfully.

Furthermore, the data transfer performance of the signal transfer-unit between the modules which operate with the clocks of different frequencies whose clock ratio is a non-integral multiple is reduced in the case of the above-described embodiment, but in the case in which the data transfer between the modules does not occur so frequently, it is possible that each module operate at the desired operating frequency successfully. Moreover, according to the above-described embodiment, it is possible to prevent reduction of the data transfer performance of the signal transfer unit or the bus interface unit appropriately.

The present invention is not limited to the above-described embodiments, and variations and modifications may be made without departing from the scope of the present invention.

What is claimed is:

1. A semiconductor integrated circuit device, comprising:
an internal bus;
a plurality of internal modules connected to the internal bus and including a main module performing a predetermined function; and
a clock generating unit generating a reference clock and a clock sync signal which indicates positions of valid clock edges in the reference clock, the clock generating unit supplying the reference clock and the clock sync signal to at least one of the plurality of internal modules,
wherein
said at least one of the plurality of internal modules is provided with a sync control module which generates an internal clock based on the reference clock and the clock sync signal,
the sync control module comprises a control unit which generates an internal clock control signal that indicates whether said at least one of the plurality of internal modules is activated, and the sync control module starting or stopping the supply of the clock sync signal in response to the internal clock control signal, and
the control unit of the sync control module generates the internal clock control signal based on any of an interrupt request signal, a DMA request signal, a clock control signal received from the main module, and a bus request or acknowledge signal defined by a bus protocol of the internal bus.

2. A semiconductor integrated circuit device of claim 1 wherein the clock generating unit generates a plurality of signal pairs which correspond to different clock frequencies, each signal pair including the reference clock and the clock sync signal, the clock generating unit supplying the plurality of signal pairs to the plurality of internal modules respectively.

3. A semiconductor integrated circuit device of claim 1 wherein the sync control module generates the internal clock that has clock edges whose positions in the internal clock accord with the positions of the valid clock edges in the reference clock.

4. A semiconductor integrated circuit device of claim 1 wherein the sync control module comprises a gate unit which controls starting and stopping of the supply of the clock sync signal, and the gate unit stops the supply of the clock sync signal when operation of said at least one of the internal modules is not required.

5. A semiconductor integrated circuit device of claim 1 wherein the sync control module comprises a mask unit which controls supplying and mask processing of the clock sync signal to said at least one of the internal modules, and the mask unit performs the mask processing of the clock sync signal and supplies the masked clock sync signal when operation of said at least one of the internal modules is required.

6. A semiconductor integrated circuit device of claim 1 wherein the clock generating unit generates a plurality of clock sync signals which correspond to different clock frequencies, and supplies the plurality of clock sync signals to the plurality of internal modules, and the sync control module receives the plurality of clock sync signals, and generates the internal clock based on the reference clock and a selected one of the plurality of the clock sync signals that is selected according to an operating frequency of said at least one of the plurality of internal modules.

7. A semiconductor integrated circuit device of claim 1 wherein the sync control module comprises:
a counter which performs a counting operation in response to the reference clock and generates a masked signal according to a counted value;
a gate unit which generates the internal clock control signal by skipping the clock sync signal at a predetermined rate based on the masked signal; and
an internal clock generating unit which generates the internal clock based on the reference clock and the internal clock control signal.

8. A semiconductor integrated circuit device, comprising:
a plurality of internal modules including bus masters and bus slaves which have a main module performing a predetermined function respectively;
a bus unit interconnecting the bus masters and the bus slaves in a pipelined manner;
a clock generating unit generating a reference clock and a clock sync signal which indicates positions of valid clock edges in the reference clock, the clock generating unit supplying the reference clock and the clock sync signal to the bus unit,
wherein
the bus unit is provided with a sync control module which generates an internal clock based on the reference clock and the clock sync signal, the sync control module supplying the internal clock to at least one of the bus slaves,
the sync control module comprises a control unit which generates an internal clock control signal that indicates whether at least one of said plurality of internal modules is activated, and the sync control module starting or stopping the supply of the clock sync signal in response to the internal clock control signal, and
the control unit of the sync control module generates the internal clock control signal based on any of an interrupt request signal, a DMA request signal, a clock control signal received from the main module, and a bus request or acknowledge signal defined by a bus protocol of the bus unit.

9. A semiconductor integrated circuit device of claim 8 wherein the bus unit is provided with a bus control unit which controls connection between the bus masters and the bus slaves, and the bus control unit is provided with the sync control module.

10. A semiconductor integrated circuit device, comprising:
a plurality of internal modules including bus masters and bus slaves which have a main module performing a predetermined function respectively;
a bus unit interconnecting the bus masters and the bus slaves in a crossbar manner;
a clock generating unit generating a reference clock and a clock sync signal which indicates positions of valid clock edges in the reference clock, the clock generating unit supplying the reference clock and the clock sync signal to the bus unit,
wherein
the bus unit is provided with a sync control module which generates an internal clock based on the reference clock and the clock sync signal, the sync control module supplying the internal clock to at least one of the bus slaves,
the sync control module comprises a control unit which generates an internal clock control signal that indicates whether at least one of said plurality of internal modules is activated, and the sync control module starting or stopping the supply of the clock sync signal in response to the internal clock control signal, and
the control unit of the sync control module generates the internal clock control signal based on any of an interrupt request signal, a DMA request signal, a clock control signal received from the main module, and a bus request or acknowledge signal defined by a bus protocol of the bus unit.

11. A semiconductor integrated circuit device of claim 10 wherein the bus unit is provided with a plurality of bus interface units which correspond to the bus masters and the bus slaves respectively, and at least one of the plurality of the bus interface units is provided with the sync control module.

12. A semiconductor integrated circuit device of claim 10 wherein the sync control module comprises a mask unit which controls supplying and mask processing of the clock sync signal to a corresponding one of a plurality of bus interface units, and the mask unit performing the mask processing of the clock sync signal and supplying the masked clock sync signal to a corresponding one of the bus slaves when operation of the corresponding bus slave is required.

13. A semiconductor integrated circuit device of claim 1 wherein each of the plurality of internal modules includes a bus interface unit connected to the internal bus, and the sync control module generates a first internal clock being supplied to the main module and a second internal clock being supplied to the bus interface unit.

14. A clock sync control method for controlling an internal clock in a semiconductor integrated circuit device which includes an internal bus and a plurality of internal modules connected to the internal bus and including a main module performing a predetermined function, the method comprising:
generating a reference clock and a clock sync signal which indicates positions of valid clock edges in the reference clock;
supplying the reference clock and the clock sync signal to at least one of the plurality of internal modules;
generating an internal clock based on the reference clock and the clock sync signal by at least one of the plurality of internal modules,
generating an internal clock control signal that indicates whether said at least one of the plurality of internal modules is activated, and starting or stopping the supply of the clock sync signal in response to the internal clock control signal, and
generating the internal clock control signal based on any of an interrupt request signal, a DMA request signal, a clock control signal received from the main module, and a bus request or acknowledge signal defined by a bus protocol of the internal bus.

15. A semiconductor integrated circuit device, comprising:
an internal bus;
a first internal module connected to the internal bus and including a first main module performing a predetermined first function;
a second internal module connected to the internal bus and including a second main module performing a predetermined second function, the second internal module performing data transfer with the first internal module via the internal bus; and a clock generating unit generating a first reference clock and supplying the first reference clock to the first internal module, the clock generating unit generating a second reference clock and a clock sync signal which indicates positions of valid clock edges in the second reference clock, corresponding to positions of clock edges in the first reference clock, and the clock generating unit supplying the second reference clock and the clock sync signal to the second internal module, wherein the first internal module performs data transfer according to the clock edges of the first reference clock when the first main module performs the first function according to the first reference clock, and the second internal module performs, when the second main module performs the second function according to the second reference clock, data transfer according to the valid clock edges of the second reference clock based on the clock sync signal and the second reference clock.

16. A semiconductor integrated circuit device of claim 15 wherein a clock frequency of the first reference clock is lower than a clock frequency of the second reference clock.

17. A semiconductor integrated circuit device of claim 15 wherein clock edges of the second reference clock are at equal intervals, and the clock edges of the first reference clock are not at equal intervals.

18. A semiconductor integrated circuit device of claim 15 wherein all the positions of the clock edges in the first reference clock are corresponding to positions of clock edges of the second reference clock.

19. A semiconductor integrated circuit device of claim 15 wherein a clock ratio of a frequency of the second reference clock to a frequency of the first reference clock is a non-integral multiple.

20. A semiconductor integrated circuit device of claim 15 wherein the data transfer between the first internal module and the second internal module is performed at an operating frequency which is equal to a clock frequency of the first reference clock.

21. A semiconductor integrated circuit device, comprising:

an internal bus;

a first internal module connected to the internal bus and including a first main module performing a predetermined first function;

a second internal module connected to the internal bus and including a second main module performing a predetermined second function, the second internal module performing data transfer with the first internal module via the internal bus; and a clock generating unit generating a reference clock and a clock sync signal which indicates positions of valid clock edges in the reference clock, and supplying the reference clock and the clock sync signal to both the first internal module and the second internal module, wherein the first internal module comprises an internal clock generating unit which generates an internal clock, which is supplied to the first main module, based on the reference clock and the clock sync signal, and the first internal module performs data transfer according to clock edges of the internal clock when the first main module performs the first function according to the internal clock, and the second internal module performs, when the second main module performs the second function according to the reference clock, data transfer according to the valid clock edges of the reference clock based on the clock sync signal and the reference clock.

22. A semiconductor integrated circuit device of claim 21 wherein the clock edges of the reference clock are at equal intervals, and the clock edges of the internal clock are not at equal intervals.

23. A semiconductor integrated circuit device of claim 21 wherein a clock ratio of a frequency of the reference clock to a frequency of the internal clock is a non-integral multiple.

24. A semiconductor integrated circuit device of claim 21 wherein the internal clock generating unit is a sync control module which is provided in at least one of the first and second internal modules and generates the internal clock based on the reference clock and the clock sync signal.

25. A semiconductor integrated circuit device of claim 21 wherein positions of clock edges in the clock sync signal which indicates the positions of the valid clock edges in the reference clock are backwardly shifted by one cycle from the positions of the valid clock edges in the reference clock.

26. A semiconductor integrated circuit device of claim 21 wherein the data transfer between the first internal module and the second internal module is performed at an operating frequency that is equal to a clock frequency of the internal clock.

27. A semiconductor integrated circuit device of claim 21 wherein positions of clock edges in the internal clock are corresponding to the positions of the valid clock edges in the reference clock.

28. A data transfer control method which controls data transfer between a first internal module and a second internal module in a semiconductor integrated circuit device which includes an internal bus, the first internal module connected to the internal bus and including a first main module performing a predetermined first function, and the second internal module connected to the internal bus and including a second main module performing a predetermined second function, the second internal module performing data transfer with the first internal module via the internal bus, comprising steps of:

generating a first reference clock and supplying the first reference clock to the first internal module;

generating a second reference clock and a clock sync signal which indicates positions of valid clock edges in the second reference clock, corresponding to positions of clock edges in the first reference clock, and supplying the second reference clock and the clock sync signal to the second internal module;

controlling data transfer according to the clock edges of the first reference clock by the first internal module; and controlling data transfer according to the valid clock edges of the second reference clock based on the clock sync signal and the second reference clock by the second internal module.

29. A data transfer control method which controls data transfer between a first internal module and a second internal module in a semiconductor integrated circuit device which includes an internal bus, the first internal module connected to the internal bus and including a first main module performing a predetermined first function, and the second internal module connected to the internal bus and including a second main module performing a predetermined second function, the second internal module performing data transfer with the first internal module via the internal bus, comprising steps of:

generating a reference clock and a clock sync signal which indicates positions of valid clock edges in the reference clock, and supplying the reference clock and the clock sync signal to both the first internal module and the second internal module;

generating an internal clock, which is supplied to the first main module, based on the reference clock and the clock sync signal by the first internal module;

controlling data transfer according to clock edges of the internal clock when performing the first function according to the internal clock by the first main module, and controlling, when performing the second function according to the reference clock by the second main module, data transfer according to the valid clock edges of the reference clock based on the clock sync signal and the reference clock.

30. A semiconductor integrated circuit device, comprising:

an internal bus;

a first internal module connected to the internal bus and including a first main module performing a predetermined first function;

a second internal module connected to the internal bus and including a second main module performing a predetermined second function, the second internal module performing data transfer with the first internal module via the internal bus; and a clock generating unit generating a first reference clock and a first clock sync signal which indicates positions of valid clock edges in the first reference clock, and supplying the first reference clock and the first clock sync signal to the first internal module, and the clock generating unit generating a second reference clock and a second clock sync signal which indicates positions of valid clock edges in the second reference clock, and supplying the second reference clock and the second clock sync signal to the second internal module, wherein the first internal module performs data transfer according to the valid clock edges of the first reference clock based on the first clock sync signal and the first reference clock when the first main module performs the first function according to the first reference clock, and the second internal module performs, when the second main module performs the second function according to the second reference clock, data transfer according to the valid clock edges of the second reference clock based on the second clock sync signal and the second reference clock.

31. A semiconductor integrated circuit device of claim 30 wherein the data transfer between the first internal module and the second internal module is performed at an operating frequency that is equal to a highest common factor of a clock frequency of the first reference clock and a clock frequency of the second reference clock.

32. A semiconductor integrated circuit device of claim 30 wherein the positions of the valid clock edges in the first reference clock are corresponding to the positions of the valid clock edges in the second reference clock.

33. A semiconductor integrated circuit device of claim 30 wherein at least one of rising edges and falling edges of the first clock sync signal are in accordance with corresponding one of rising edges and falling edges of the second clock sync signal.

34. A semiconductor integrated circuit device of claim 30 wherein the positions of the clock edges in both the first reference clock and the second reference clock are at equal intervals.

35. A semiconductor integrated circuit device of claim 30 wherein each of the first internal module and the second internal module comprises a bus interface unit which generates, when receiving a data signal on the internal bus, a bus control signal based on the first clock sync signal or the second clock sync signal, the bus control signal indicating a validity of the data signal on the internal bus, so that the bus interface unit receives the data signal in accordance with the bus control signal.

36. A semiconductor integrated circuit device of claim 35 wherein the bus interface unit is provided to output alternately a first bus control signal indicating that the data signal on the internal bus is valid, and a second bus control signal indicating that the data signal on the internal bus is invalid.

37. A semiconductor integrated circuit device of claim 35 wherein a data bus width of the first internal module differs from a data bus width of the second internal module, and one of the first and second internal modules having the smaller data bus width receives two or more signal portions of the data signal, which are outputted to the internal bus from the other internal module having the larger data bus width, according to the bus control signal.

38. A semiconductor integrated circuit device of claim 37 wherein the bus interface unit is provided to output continuously the bus control signal indicating that the data signal on the internal bus is valid, at a number of cycles according to the number of the signal portions in the data signal.

39. A semiconductor integrated circuit device of claim 35 wherein a data bus width of the first internal module differs from a data bus width of the second internal module, one of the first and second internal modules having the smaller data bus width comprises two or more bus interface units each of which generates said bus control signal, and said one of the first and second internal modules receives the data signal, which is outputted to the internal bus from the other internal module, through the bus interface units in a parallel manner.

40. A data transfer control method which controls data transfer between a first internal module and a second internal module in a semiconductor integrated circuit device which includes an internal bus, the first internal module connected to the internal bus and including a first main module performing a predetermined first function, and the second internal module connected to the internal bus and including a second main module performing a predetermined second function, the second internal module performing data transfer with the first internal module via the internal bus, the method comprising steps of:

generating a first reference clock and a first clock sync signal which indicates positions of valid clock edges in the first reference clock, and supplying the first reference clock and the first clock sync signal to the first internal module;

generating a second reference clock and a second clock sync signal which indicates positions of valid clock edges in the second reference clock, and supplying the second reference clock and the second clock sync signal to the second internal module;

controlling data transfer according to the valid clock edges of the first reference clock based on the first clock sync signal and the first reference clock, when performing the first function according to the first reference clock by the first main module; and controlling, when performing the second function according to the second reference clock by the second main module, data transfer according to the valid clock edges of the second reference clock based on the second clock sync signal and the second reference clock.

41. A semiconductor integrated circuit device, comprising:
an internal bus;
a plurality of internal modules connected to the internal bus and including a main module performing a predetermined function; and
a clock generating unit generating a reference clock and a clock sync signal which indicates positions of valid clock edges in the reference clock, the clock generating unit supplying the reference clock and the clock sync signal to at least one of the plurality of internal modules,
wherein
said at least one of the plurality of internal modules is provided with a sync control module which performs a predetermined internal processing based on the reference clock and the clock sync signal,
the sync control module comprises a control unit which generates an internal clock control signal that indicates whether said at least one of the plurality of internal modules is activated, and the sync control module starting or stopping the supply of the clock sync signal in response to the internal clock control signal, and
the control unit of the sync control module generates the internal clock control signal based on any of an interrupt request signal, a DMA request signal, a clock control signal received from the main module, and a bus request or acknowledge signal defined by a bus protocol of the internal bus.

42. A semiconductor integrated circuit device of claim 41 wherein the predetermined internal processing is an internal clock generating processing to generate an internal clock, which is supplied to said at least one of the internal modules.

43. A semiconductor integrated circuit device of claim 41 wherein the predetermined internal processing is a signal synchronization processing to carry out, when performing data transfer between the plurality of internal modules through the internal bus, a synchronization control of a data signal between two internal modules which are related to the data transfer and operate at different operating frequencies.

44. A semiconductor integrated circuit device of claim 41 wherein at least one of the plurality of internal modules comprises a module which performs the predetermined internal processing according to the valid clock edge of the reference clock.

45. A semiconductor integrated circuit device, comprising:
a internal module, comprising a sync control module; and
a clock generating unit generating a reference clock and a clock sync signal which indicates positions of valid clock edges in the reference clock, the clock generating unit supplying the reference clock and the clock sync signal to the internal module,
wherein
the sync control module generates an internal clock based on the reference clock and the clock sync signal,
the sync control module comprises a control unit which generates an internal clock control signal that indicates whether said internal module is activated, and the sync control module starting or stopping the supply of the clock sync signal in response to the internal clock control signal, and
the control unit of the sync control module generates the internal clock control signal based on any of an interrupt request signal, a DMA request signal, and a clock control signal received from the main module.

* * * * *